(12) United States Patent
Persson et al.

(10) Patent No.: US 10,075,872 B2
(45) Date of Patent: Sep. 11, 2018

(54) DYNAMIC COMPRESSION COVERAGE

(71) Applicant: TELEFONAKTIEBOLAGET L M ERICSSON (PUBL), Stockholm (SE)

(72) Inventors: Fredrik Persson, Märsta (SE); Tomas Lundborg, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 128 days.

(21) Appl. No.: 15/032,118

(22) PCT Filed: Mar. 4, 2014

(86) PCT No.: PCT/EP2014/054192
§ 371 (c)(1),
(2) Date: Apr. 26, 2016

(87) PCT Pub. No.: WO2015/062746
PCT Pub. Date: May 7, 2015

(65) Prior Publication Data
US 2016/0309363 A1   Oct. 20, 2016

Related U.S. Application Data

(60) Provisional application No. 61/897,125, filed on Oct. 29, 2013.

(51) Int. Cl.
*H04W 28/06* (2009.01)
*H04L 29/06* (2006.01)
*H04L 12/811* (2013.01)

(52) U.S. Cl.
CPC ............ *H04W 28/06* (2013.01); *H04L 47/38* (2013.01); *H04L 69/04* (2013.01); *H04L 69/22* (2013.01)

(58) Field of Classification Search
CPC ........................... H04L 69/04; H04L 67/2828
USPC .............................. 370/229, 230.1, 465, 521
See application file for complete search history.

(56) References Cited

U.S. PATENT DOCUMENTS

| | | | | |
|---|---|---|---|---|
| 5,406,280 A * | 4/1995 | Cogan | ..................... | G06T 9/005 341/50 |
| 6,661,845 B1 * | 12/2003 | Herath | ..................... | H04B 1/66 375/240.23 |
| 6,804,238 B1 * | 10/2004 | Euget | ..................... | H04L 29/06 370/392 |
| 7,342,902 B2 * | 3/2008 | Garakani | ................ | H03M 7/30 370/329 |
| 8,456,331 B2 * | 6/2013 | Carlson | ............... | H03M 7/3084 341/51 |
| 8,750,370 B2 * | 6/2014 | Nagapudi | ............. | H04L 45/745 375/240.02 |
| 9,253,015 B2 * | 2/2016 | Girard | ................... | H04L 45/245 |
| 9,295,065 B2 * | 3/2016 | Dahod | ............... | H04N 21/6131 |
| 9,515,679 B1 * | 12/2016 | Harnik | .................... | H03M 7/46 |

(Continued)

*Primary Examiner* — Dmitry Levitan

(57) ABSTRACT

Methods and apparatus are provided for use in compressing packet traffic associated with a user equipment in a network. The compression ratio is estimated/calculated for a packet in the packet traffic based on a compression length for compressing the packet. The estimated/calculated compression ratio is compared with a target compression ratio. The compression length is adjusted when the estimated compression ratio has not reached at least the target compression ratio. The adjusted compression ratio is used as the compression length for compressing the packet traffic.

29 Claims, 10 Drawing Sheets

(56) References Cited

U.S. PATENT DOCUMENTS

| | | | |
|---|---|---|---|
| 9,585,059 B2* | 2/2017 | Persson | H04L 69/04 |
| 2007/0274382 A1 | 11/2007 | Hickey et al. | |
| 2011/0058474 A1 | 3/2011 | Nagapudi et al. | |
| 2011/0310955 A1* | 12/2011 | Zhang | H04N 19/172 |
| | | | 375/240.02 |
| 2014/0198789 A1* | 7/2014 | Kim | H04L 69/04 |
| | | | 370/392 |

\* cited by examiner

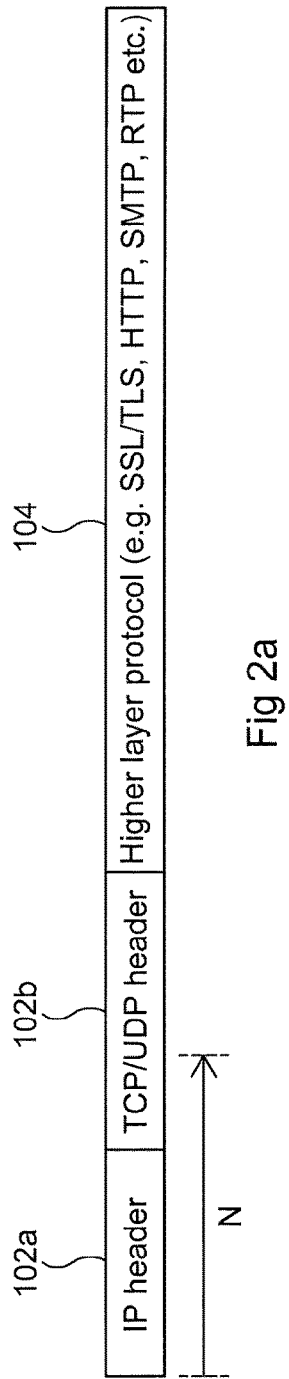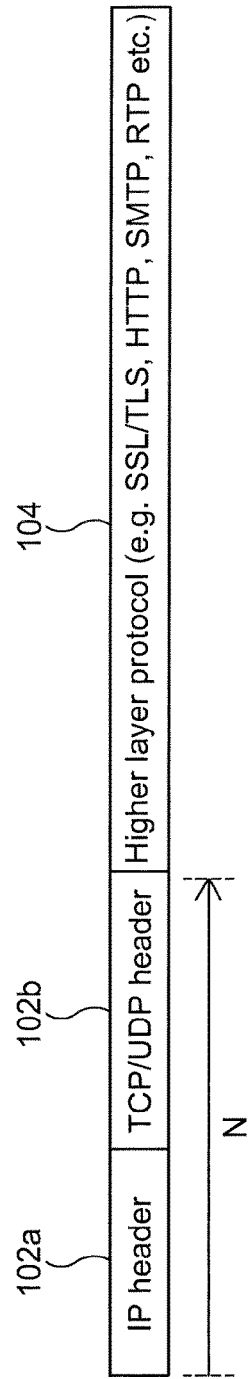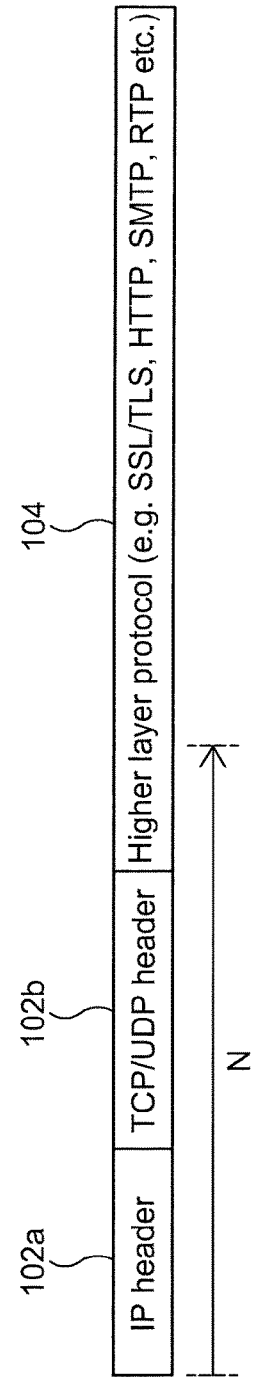

DYNAMIC COMPRESSION COVERAGE

RELATED PATENT APPLICATION

This application is related to U.S. patent application Ser. No. 14/527,607, filed on Oct. 29, 2014, now U.S. Pat. No. 9,585,059, which claims the benefit if priority to U.S. Provisional Patent Application No. 61/897,125, filed on Oct. 29, 2013. The disclosure of these documents are hereby incorporated herein by reference for all purposes.

TECHNICAL FIELD

The present invention relates to methods and apparatus for estimating compression lengths for use in optimising compression/decompression of packet traffic in a network.

BACKGROUND

Data communications in packet switched (PS) networks includes the transmission of data over a network as a sequence of small data chunks or suitable sized data blocks called packets. Each packet is passed through the network from a source (e.g. a user equipment (UE), terminal, mobile device, or other network entity) to a destination (e.g. another UE, terminal, mobile device, or another network entity) via one or more network entities or nodes. Each packet typically includes a data payload, which is a small chunk of the data being transmitted, and a packet header, which typically provides information such as the destination and/or source address and the type of packet or communications protocols being used.

PS networks may comprise or represent a communication network that groups all transmitted data into suitable sized data blocks called packets. Examples of specific PS networks that may be used in certain embodiments of the described network include, but are not limited to, legacy PS networks such as the second generation (2G), 2.5 generation (2.5G), third generation (3G), and fourth generation and beyond (4G and beyond) type networks, and/or evolved packet switched (EPS) networks, and/or all internet protocol (IP) based PS networks.

For example, the so-called Universal Mobile Telephone System (UMTS) (a legacy PS network commonly known as a 3G radio communication system) is a PS network standard that has evolved into using enhanced PS network technologies such as High Speed Packet Access (HSPA) technology. In addition, air interface technologies within the UMTS framework have begun to evolve towards new air interface technologies defined in the so-called Long Term Evolution (LTE) and LTE-Advanced systems.

The next generation radio communication systems and networks such as LTE and LTE-Advanced are considered to be all IP networks. These networks will have an upgraded PS network infrastructure called the evolved packet system (EPS). The EPS includes an evolved packet core (EPC) that forms the basis of the core PS network for the all IP network. These enhanced PS networks will provide all the mobile core functionality that, in the previous generations (2G, 2.5G, and 3G), has been realised through the existing CS networks and legacy PS networks.

The UE may comprise or represent any device used for communications. Examples of a UE that may be used in certain embodiments of the described network are wireless devices such as mobile phones, mobile devices, terminals, smart phones, portable computing devices such as lap tops, handheld devices, tablets, netbooks, computers, personal digital assistants and other wireless communication devices, or wired communication devices such as telephones, computing devices such as desktop computers, set-top boxes, and other fixed communication devices.

A network element or entity may comprise or represent any network node, device, function, or entity for use in a telecommunications network which can be managed over a specific interface. Examples of network elements or entities that may be used in certain embodiments of the described network(s) are network elements, nodes, devices, functions, or entities that make up core network(s), access network(s) such as packet or circuit switched network(s), IP based networks, 2G, 3G, 4G and next generation networks, IMS core network, IMS service network, and service and external networks and the like.

Data communications has evolved to use many different communications protocols or standards (e.g. Internet Protocols, TCP/IP protocols, UDP protocols etc.) for use in transmitting data from a source to the destination. These communications protocols may be layered in a so-called protocol stack in which a layer of the protocol stack serves the layer above it and the layer below it.

Typically a protocol stack includes an application layer, a transport layer and a network layer. The application layer includes logic needed to support various user applications or application programs, the transport layer includes mechanisms to provide reliable communication of application data controlled by the application layer, and the network layer is concerned with exchange of data between the source and the destination or the physical devices in the network. Examples of protocol stacks include the TCP/IP protocol suite (providing application, transport, internet, network access, and physical layers) or the open systems interconnection (OSI) model (providing application, presentation, session, transport, network, data link, and physical layers).

Data communications such as wireless and/or wired communications is becoming ubiquitous in many parts of the world. As communication network technology, UE capabilities, and applications advance and proliferate, ever-increasing amounts of data are being transmitted or transferred between UEs and communication networks. The ever-increasing amounts of data being transmitted will put pressure on the capacity and throughput of current and future communication network technologies. For example, many modern wireless communication networks are capacity-limited; decreasing the amount of data transferred between each UE and the communication network will improve overall performance and system capacity.

FIG. 1 illustrates the structure of an example packet 100 including a packet header 102 followed by the packet payload 104. In this example, the packet header 102 includes an Internet Protocol (IP) header 102a and a transport protocol header 102b (e.g. a TCP/UDP header). The packet payload 104 includes higher layer protocol information and the data or data chunk being transmitted. In order to provide reliable communications, data is passed between the layers in the form of packets, in which at each layer may insert additional data related to that layer to the payload of a packet and a header related to that layer. This means that packets may include one or more packet headers (e.g. IP header 102a and TCP/UDP header 102b) associated with the various communications protocols and/or layers of the protocol stack that may be used when communicating the data from the source to the destination. The headers depend on where in the network or at what level/layer (e.g. application layer, transport layer, or network layer) of the communication protocol or system the packet data is situated. It is to be appreciated that the example packet 100 and header 102 and payload 104 have been described for simplicity and by way of example only, in terms of the transport protocol layer (e.g. IP header 102a and TCP/UDP header 102b). The person skilled in the art would understand that the description herein applies to any packet including any header and any payload and may be based on any protocol or layer.

Transmission efficiency of packets may be increased by compressing the packets before transmission. There are many compression methods/algorithms that may be used for compressing packets. Typically, file compression methods/algorithms or compression method/algorithms treat packets as bit streams and operate to compress the bit streams. Such compression algorithms may include a compressor function and a corresponding de-compressor function. For example, the GNU's Not Unix (GNU) ZIP or GZIP is one of the many software application or compression algorithm for file compression and decompression. GZIP uses Lempel-Ziv coding (LZ77) lossless compression combined with Huffman entropy coding.

The GZIP compression algorithm is used by way of example only and for simplicity due to the plethora of compression/decompression algorithms available, it is to be appreciated a person skilled in the art would understand that the present invention is not so limited and that any suitable compression method/algorithm and/or decompression method/algorithm may be used.

Conventionally, the packet 100 may be compressed by performing compression on the packet header 102 and packet payload 104 separately. Most of the packet header information is either static or can be updated according to predictable patterns. As packet headers only include textual information fields, they can be easily compressed to increase transmission efficiency. Conventionally, packet headers in packet traffic transmitted over a network are compressed by analysing the header(s) of each packet to determine the number of bits that are to be compressed. For example, when applying packet header compression, the packet header is analyzed in detail, and specific packet header fields are divided into static, semi-dynamic and dynamic fields. In this case the packet header shall be treated as a bit stream without making specific considerations about the header, except for limiting the compression range to cover the bits of the header. For example, a compression method/algorithm such as GZIP may be applied to specific parts of a bit stream, such as packet headers.

There are various protocol header formats that may be used in a packet header 102, for example, various transport and IP protocol header formats may be based on the User Datagram Protocol (UDP) protocol, Internet Protocol version 4 (IPv4) protocol, Internet Protocol version 6 (IPv6) protocol, and Transmission Control Protocol (TCP). It is to be appreciated that these example protocol header formats (e.g. UDP, IPv4, IPv6, and TCP) have been described for illustration purposes and by way of example only; the person skilled in the art would understand that the description herein applies to any header format or even any payload independent of the protocol used for defining the packet. The sizes of the headers for these different IP level protocols are shown in Table 1.

TABLE 1

Example IP level protocol headers and sizes.

| Protocol header (size) [bytes] | Optional fields, size [bytes] |
|---|---|
| IPv4 (20) | Options (20-60) |
| IPv6 (40) | Extension headers |
| UDP (8) | |
| TCP (20) | Options (0-40) |

It is apparent that each protocol uses a different header format that has a different size. In the header, the IP version is visible in the "version" field in the IP header, and the underlying transport protocol is also given in the IP header. To efficiently compress the a packet header 102, analytical methods for identifying the size of headers may be used such as IP packet inspection (PI), which may be sufficient to identify which protocols are being used over a specific connection and hence estimate the packet header size of each packet 100.

In addition, the packet payload 104 of a packet 100 may be compressed using compression methods/algorithms working on packet data traffic. For example, a compression algorithm such as GZIP or similar can be adopted. There exist different payload compression methods, some compressing individual data packets and others working across data packet boundaries (rather considering a flow of packets as a bit stream), while others compress entire data packets and others apply compression on specifically selected parts of data packets. In that last perspective a selected part can be specific packet headers like in many header compression algorithms. Such compression algorithms include a compressor function and a corresponding de-compressor function.

Typically, when the payload 104 above the transport level is not compressible, the compression ratio, which may be defined as the ratio of the compressed packet size to the uncompressed packet size, will not improve beyond compressing the packet headers 102. For example, there is no benefit compressing the payload 104 when encryption using Transport Layer Security (TLS) is used. However, if data above the transport layer is not encrypted then the data may be highly compressible depending on the type of data, for example, application layer signaling and overhead. Again, to efficiently compress the packet payload 104, analytical methods for identifying the type of payload and size of the payload may be used such as PI.

PI may comprise or represent the analysis of packets at different levels, from IP header classification to the deep packet inspection (DPI). The following describes some of the different levels of packet inspection and analysis that may be performed; these include, but are not limited to, IP header classification, shallow inspection, DPI, and heuristic detection.

IP header classification (a.k.a. 5-tuple inspection) is used to inspect packets up to the Internet layer, the so-called 5-tuple (Source IP address, Source IP port, Destination IP address, Destination IP port, Protocol (which runs on Transport layer, e.g. TCP, User Datagram Protocol (UDP), etc.) IP header classification is useful for identifying traffic targeting a specific port number, or a specific protocol. It is also useful when traffic from certain traffic domains, e.g. the Internet or Virtual Private Networks (VPNs), shall be treated in a specific way. For example, giving all Internet traffic a certain quality of service treatment (e.g., priority) or adding a different security protocol to a VPN.

Shallow inspection (a.k.a. Stateful inspection) is an analysis of the Transport Level protocol state, by inspecting the current protocol header (TCP, UDP etc.). For example, analysing the sequence of TCP header flags like SYN, ACK and FIN tells the state of the connection, and the receiver window size. Shallow inspection is useful when link layer algorithms are triggered by sequences of events of higher layer protocol interactions, without the need of knowing what content is carried. One example of use is to decrease the user terminal battery consumption by letting lower layer protocol states follow higher layer protocol layers. Shallow inspection also includes the analysis of all the fields of the IP header.

Deep packet inspection (DPI) is an analysis of data content on the Application Layer, e.g. hypertext transfer protocol (HTTP) state, video frame content, etc. One common example where DPI is used is caching, where the HTTP request is analysed to identify which content to fetch from the cache. Link layer algorithms can also be made to adapt to specific types of content or applications.

Heuristic detection includes pattern detection or statistical identification methods on Application Layer data. Typically needed for classification of services with encrypted content, or for applications that intentionally tries to avoid identification (e.g., to avoid blocked of free voice of IP applications).

Conventionally, due to the large variation of possible packet headers and payloads in packet traffic transmitted over a network, PI needs to be performed on each packet when applying packet header and packet payload compression. The packet header and/or packet payload has to be analyzed in detail. PI may be used to determine the length of a packet header 102 such that the header may be compressed using packet compression algorithms prior to transmission. Similarly, PI may be used to determine the length of the packet payload 104 such that the payload may be compressed using packet compression algorithms prior to transmission. The header length may represent the number of bits or bytes of the packet header, and payload length may represent the number of bits or bytes of the payload.

Given the sheer number of packets being transmitted in a network, performing PI such as IP header classification, shallow inspection, DPI, and/or heuristic detection for each packet in order to determine the packet header length and packet payload length that are compressible is becoming infeasible. This is due to the large amount of packet traffic, the computational resources required for PI on each packet due to insufficient hardware or software (e.g. UEs), and/or the delays incurred for performing PI on each packet. In addition, trying to compress an entire packet 100 while only a fraction of may be compressible demands an unnecessarily large computation effort when the whole packet is to be compressed. In some situations, it may be desired to only compress headers 102 and not the payload 104 part of a packet 100. However, in other situations, the payload may be compressible and thus both header and payload compression may be desired to reduce bandwidth usage and improve throughput in the communication network. Thus, PI is typically required to determine which parts of a packet 100 are compressible and which parts are not compressible. It is apparent that either compressing the entire packet when only a fraction is compressible or using PI functionality to observe the content of the packets requires a lot of unnecessary computational effort. Therefore, there is a significant need to optimise the compression and decompression of packets for packet traffic in the network while minimising the computational resources and delays in transmitting packets in the network and maximising bandwidth efficiency and throughput of data transmission in the network.

SUMMARY

Whilst performing packet inspection (PI) on each and every packet in the network may determine the header length of each packet and/or the payload and whether the payload is compressible, it is rather computationally intensive and can incur significant delay. It is an object of the present invention to provide methods and apparatus for estimating the compression ratio and dynamically adjusting the compression length for compressing packets to be transmitted and/or packet traffic in a network to minimise the computational resources and delays in compressing packets while at the same time optimising the possible compression gain for the UE packet traffic, thereby optimising network performance.

An aspect of the present invention provides a method for compressing packet traffic associated with a user equipment in a network. The method includes the steps of estimating a compression ratio for a packet in the packet traffic based on a compression length for compressing the packet, comparing the estimated compression ratio with a target compression ratio, and adjusting the compression length when the estimated compression ratio has not reached at least the target compression ratio. The adjusted compression length is used as the compression length for compressing the packet traffic or further packet traffic.

Optionally, the method includes repeating the steps of estimating, comparing and adjusting the compression length for the packet until the estimated compression ratio reaches at least the target compression ratio. As an option, the compression length may represent the number of data units such as bits or bytes of the packet(s) that are to be compressed/decompressed. Alternatively or additionally, the method may include repeating the steps of estimating, comparing and adjusting the compression length for another one or more packet(s) in the packet traffic until the estimated compression ratio reaches at least the target compression ratio. As an option, the another one or more packet(s) of the packet traffic may be at least one of a) another one or more consecutive packet(s) within the packet traffic, and/or b) another one or more packet(s) spaced apart within the packet traffic.

As a further option, the steps of estimating, comparing and adjusting the compression length may be repeated a fixed number of times. Alternatively or additionally, the steps of estimating, comparing and adjusting may be repeated based at least one of a) the estimated compression ratio reaching at least the target compression ratio; b) the estimated compression ratio being substantially the same as one or more previous estimated compression ratio(s); and c) the change in compression gain from a previous iteration of the steps of estimating, comparing and adjusting is less than a compression gain threshold value. Optionally, the steps of estimating, comparing and adjusting the compression length are repeated at periodic intervals.

As an option, the method further includes the step of determining whether to adjust the compression length based on one or more of the current compression length, the target compression ratio, any previous compression lengths, and any previous estimated compression ratios. Optionally, the step of adjusting the compression length further includes determining whether to increase or decrease the compression length as a function of one or more of the current compression length, the current target compression ratio, any previous compression length(s), any previous estimated compression ratios, headers of the packet, payload data of the packet, headers of the packet traffic, and payload of at least a portion of the packet traffic.

As a further option, the compression length is adjusted by a compression length step size. The method may further include adjusting the compression length step size to increase the likelihood the estimated compression ratio reaches at least the target compression ratio. Additionally or alternatively, the method may further include determining the compression length step size for adjusting the compression length as a function of one or more of any previous compression length(s), the estimated compression ratio, the target compression ratio, any previous estimated compression ratio(s), headers and/or payload data of the packet, headers and/or payload data of at least a portion of the packet traffic.

Optionally, when the packet is an uncompressed packet, the step of estimating the compression ratio may include compressing the packet based on the compression length. Alternatively or additionally, when the packet is a compressed packet, the step of estimating the compression ratio may include decompressing the packet based on the compression length, where the compression length is used by transmitting the compression length based on the adjusted compression length to a compressor that compressed the packet for use in compressing further packets in the packet traffic. The compression length may be included in a compressing header of one or more compressed packet(s) that have been compressed based on the compression length.

According to a second aspect of the invention there is provided an apparatus for use when compressing packet traffic associated with a user equipment. The apparatus is adapted to estimate a compression ratio for a packet in the packet traffic based on a compression length for compressing the packet, compare the estimated compression ratio with a target compression ratio, adjust the compression length when the estimated compression ratio has not reached at least the target compression ratio, and use or send the adjusted compression length as the compression length for compressing the packet traffic.

As an option, the apparatus is further adapted to repeat the estimation, comparison and adjustment of the compression length for the packet until the estimated compression ratio reaches at least the target compression ratio. Additionally or alternatively, the apparatus may be further adapted to repeat the estimation, comparison and adjustment of the compression length for another one or more packets in the packet traffic until the estimated compression ratio reaches at least the target compression ratio. As an option, the another one or more packets of the packet traffic comprise at least one of: a) another one or more consecutive packet(s) within the packet traffic, and/or b) another one or more packet(s) spaced apart within the packet traffic.

Optionally, the apparatus may be further adapted to repeat the estimation, comparison and adjustment of the compression length a fixed number of times. Additionally or alternatively, the apparatus may be further adapted to repeat the estimation, comparison and adjustment of the compression length is based on at least one of a) the estimated compression ratio reaching at least the target compression ratio; b) the estimated compression ratio being substantially the same as one or more previous estimated compression ratio(s); and c) the change in compression gain from a previous iteration of the estimation, comparison and adjustment being less than a compression gain threshold value. As an option, the apparatus may be further adapted to repeat the estimation, comparison and adjustment of the compression length at periodic intervals. As a further option, the apparatus may be further adapted to determine whether to adjust the compression length based on one or more of the current compression length, the target compression ratio, any previous compression lengths, and any previous estimated compression ratios.

Optionally, the apparatus may be further adapted to adjust the compression length by determining whether to increase or decrease the compression length as a function of one or more of the current compression length, the current target compression length, any previous compression length(s), any previous estimated compression ratios, headers of the packet, payload data of the packet, headers of the packet traffic, and payload of at least a portion of the packet traffic.

As a further option, the apparatus may be further adapted to adjust the compression length by a compression length step size. Alternatively or additionally, the apparatus may be further adapted to adjust the compression length step size to increase the likelihood the estimated compression ratio reaches at least the target compression ratio. As an option, the apparatus may be further adapted to determine the compression length step size for adjusting the compression length as a function of one or more of any previous compression length(s), the estimated compression ratio, the target compression ratio, any previous estimated compression ratio(s), headers and/or payload data of the packet, headers and/or payload data of at least a portion of the packet traffic.

As an option, the apparatus may be adapted, when the packet is an uncompressed packet, to estimate the compression ratio by compressing the packet based on the compression length before estimating the compression ratio. The apparatus may use the compression length by sending the compression length based on the adjusted compression length to the compressor that compressed the packet for use in compressing further packets in the packet traffic. Alternatively or additionally, the apparatus may be adapted, when the packet is a compressed packet, to estimate the compression ratio by decompressing the packet based on the compression length before estimating the compression ratio, and to use the compression length by transmitting or sending the compression length based on the adjusted compression length to a compressor that compressed the packet for use in compressing further packets in the packet traffic.

According to another aspect of the invention there is provided a user equipment including a compressor unit, and/or a decompressor unit, the compressor unit and/or the decompressor unit each including an apparatus as described for estimating the compression length for use in compressing/decompressing packets received, transmitted and/or generated by the user equipment.

According to a further aspect of the invention, there is provided a network entity including a compressor unit and/or a decompressor unit, the compressor unit and/or the decompressor unit each including an apparatus as described for estimating the compression length for use in compressing/decompressing packets received, transmitted, and/or generated by the network entity.

According to more aspects of the invention there are provided a computer program, including instructions which, when executed on at least one processor, cause the at least one processor to carry out the method for use in compressing packets as described. There is also provided a carrier containing the computer program as described, wherein the carrier is one of an electronic signal, optical signal, radio signal, computer readable storage medium, or non-transitory computer readable medium.

The present invention provides the advantage of simplifying the implementation of data compression methods/algorithms that will compress packets without performing in-depth analysis of the packet headers and/or the packet payloads, by instead dynamically adjusting a compression length for use in compressing packets that is adjusted based on the compression ratio of the packet and a target compression ratio. The methods and apparatus provide the further advantage of maximising the likelihood of always compressing the number of bytes/bits in a packet stream that gives the most efficient compression, without relying the detection of the content of the packets or packet traffic. Other advantages include a more processing efficient implementation of packet compression without decreasing the compression gain.

BRIEF DESCRIPTION OF THE DRAWINGS

In order that the invention may be more fully understood, some of the embodiments of the invention will now be described, by way of example only, with reference to the accompanying drawings, in which:

FIGS. 2(a), (b) and (c) is a schematic illustration of estimating the compression length for compressing packets according to the invention;

DETAILED DESCRIPTION

Figure 1:
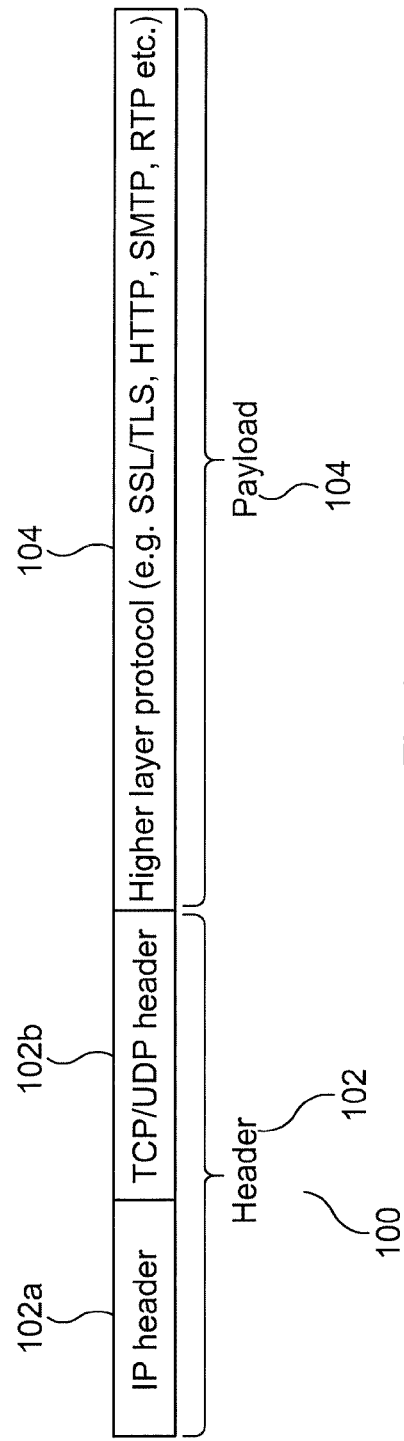
FIG. 1 is a schematic illustration of a typical packet with a packet header and packet payload.

The following description sets forth specific details, such as particular embodiments for purposes of explanation and not limitation. But it will be appreciated by one skilled in the art that other embodiments may be employed apart from these specific details. In some instances, detailed descriptions of well-known methods, interfaces, circuits, and devices are omitted so as not obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. The software program instructions and data may be stored on computer-readable storage medium, and when the instructions are executed by a computer or other suitable processor control, the computer or processor performs the functions.

Thus, for example, it will be appreciated by those skilled in the art that diagrams herein can represent conceptual views of illustrative circuitry or other functional units. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, DSP hardware, reduced instruction set processor, hardware (e.g., digital or analog) circuitry including but not limited to ASIC(s) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

As discussed above, present approaches for determining header lengths, payload lengths for packet compression/decompression can be computationally resource intensive and/or generate delays due to processing all packets being transmitted to/from user equipment, source and destination devices and/or one or more network entities. In addition, present approaches for performing packet inspection (PI) to optimise compression lengths are complex and can be slow to implement. Monitoring large amounts of packet traffic from UEs and network entities in this way is complex and requires a great deal of processing power to be carried out, often at great expense to the UE(s) and/or network element(s) or entity(ies) responsible for performing packet compression/decompression.

It is proposed herein that these problems and those described above can be addressed by method(s) and apparatus for compressing packet traffic by dynamically and adaptively deciding how much of a packet needs to be compressed in order to optimise both the computational effort and compression gain when compressing packets, while at the same time not requiring in depth PI or taking notice of the content of the data packet(s) are being compressed.

The compression functionality may contain compression and/or decompression. The entity or apparatus performing the compression may be referred to as a compressor or compressor unit, while the entity or apparatus performing the decompression may be referred to as a decompressor or decompressor unit. The method(s) and apparatus according to the invention as described herein may be located in either the UE or the network or both (e.g. a compressor unit in the UE and a decompressor unit in a network entity of the network receiving compressed packets from the UE, or a compressor unit in the network entity and a decompressor unit in another network entity receiving compressed packets from the network entity, or a compressor unit in the network entity and a decompressor unit in the UE or another UE receiving compressed packets from the network entity, etc.).

A compression length is used by the compression algorithm in the compressor unit to determine how much data in a packet should be compressed. The compression length may also be used by the decompression algorithm in the decompressor unit when decompressing a compressed packet that has been compressed based on the compression length. The compression length may be expressed in terms data units such as bytes or bits of a packet or any other suitable unit of data. The compression length may be calculated or estimated in an apparatus within the compressor unit or the decompressor unit, alternatively the apparatus may be external to the compressor unit and/or the decompressor unit.

Conventionally, when doing header compression, the compressor unit normally parses the packet to register, which kinds of protocol headers are present, which version, possible options, etc. Thereafter specific fields are picked out and treated according to their characteristics and information content. Payload compression is typically handled by the application layer, and compressed/uncompressed data encapsulated in transport layer packets.

FIGS. 2(a), 2(b) and 2(c) are schematic illustrations of using a compression length, N, that has been estimated/adjusted for optimising the compression of packets according to the invention, where the references numerals of FIG. 1 are reused for simplicity and by way of example only. As proposed herein the method(s) and apparatus according to the invention for compressing packet traffic treat both the headers 102a, 102b and payload 104 of a packet (e.g. an IP packet) as a byte or bit string and compresses the packet based on the compression length, N, which has been adjusted accordingly. The compression length, N, may be adjusted by dynamically and adaptively deciding how much of a packet needs to be compressed in order to optimise both the computational effort and compression gain when compressing packets, while at the same time not requiring in depth PI or taking notice of the content of the data packet(s) are being compressed. It is to be appreciated that the example packet 100 and header 102 and payload 104 have been described for illustrative purposes only, and by way of example, in terms of the transport protocol layer (e.g. IP header 102a and TCP/UDP header 102b), the person skilled in the art would understand that the invention as described herein can be applied to any packet including any header and any payload. The packets may be based on any protocol or layer of the protocol stack.

The adjustment of the compression length, N, may be iterated over one packet until a target compression ratio or the best compression ratio is achieved while optimising the computational effort and compression gain. The compression ratio as described herein is defined as the ratio between the uncompressed packet size and the compressed packet size. For example, the data compression ratio may be defined as: data compression ratio =uncompressed packet size/compressed packet size. Alternatively or additionally, the adjustment of the compression length, N, may be iterated over two or more packets of packet traffic. The criterion for changing the compression length is related to the calculated compression ratio, i.e. how well the data of compression length N is being compressed.

For example, the adjustment of the compression length, N, may be repeated on the same packet until at least a target compression ratio or better is reached or achieved, or until no further compression gain is achievable such that the best compression length that optimises computational effort, compression ratio and compression gain may be applied for subsequent packet compression. Additionally or alternatively, the compression length adjustment may be performed once on each subsequent packet until eventually at least the target compression ratio or better is reached, or no further compression gain is achievable and so the best compression length is selected for compressing further subsequent packets of the packet traffic.

As shown in FIG. 2a, initially the compression length, N, may be set to only compress the IP header 102a and part of the TCP/UDP header 102b. This may be because the previous packet traffic type only required this amount of compression, or simply as a start point based on estimates of the packet header to be compressed. Once compressed, the compression ratio may be estimated and compared with the target compression ratio. Depending the difference between the estimated compression ratio and the target compression ratio, the compression length may be adjusted again. This time, in FIG. 2(b), the compression length, N, is adjusted to include both the IP header 102a and the TCP/UDP header 102b. The packet (or a subsequent packet(s)) is compressed again and another estimated compression ratio is determined. Again this is compared with the target compression ratio or compared against previous compression ratios to determine whether further adjustment of the compression length is worthwhile, i.e. is it likely the target compression ratio or better is achievable given the computational complexity and compression delay in increasing the compression length, N, etc. In this example, in FIG. 2(c), the compression length is adjusted again to include both the IP header 102a, the TCP/USP header 102b and a portion of the payload 104 of the packet (or subsequent packet(s)). This process is repeated until it is determined that no further adjustment in compression length, N, is required.

Figure 3A:
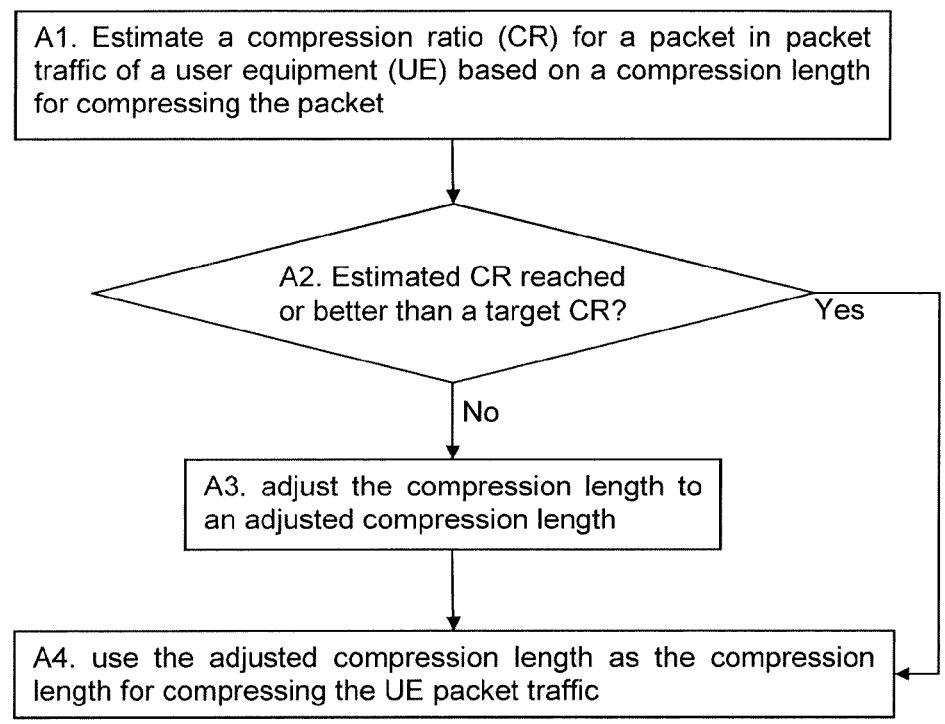
FIG. 3a is a flow diagram illustrating an example procedure carried out by an apparatus or method for use in compressing packets by estimating the compression length according to the invention.

FIG. 3a is a flow diagram illustrating an example procedure carried out by an apparatus or method(s) according to the invention for use in compressing one or more packets of packet traffic by dynamically estimating/adjusting the compression length. The steps of the procedure or method are based on the following:

A1. Estimate/calculate a compression ratio (CR) for a packet in the packet traffic of a UE based on a compression length for compressing the packet.
A2. Compare the estimated CR with a target CR. If the estimated CR has reached the target CR or is better than the target CR, then proceed to step A4. Otherwise, proceed to step A3.
A3. Adjust the compression length when the estimated CR has not reached at least the target CR.
A4. Use the adjusted compression length as the compression length for use in compressing the packet traffic or further packet traffic. This may include sending the compression length to the compressor unit for compressing the packet and/or subsequent packets.

The method may include repeating steps A1, A2 and A3 until the estimated CR reaches at least the target CR or better. The steps A1, A2, and A3 may be repeated until no further meaningful improvement in compression gain is achieved (i.e. the compression gain is less than a compression gain threshold indicating whether another iteration of steps A1, A2, A3 is required), in which case the compression length may be adjusted to the current or any previous compression lengths that provide a good compromise between computational complexity and compression gain. This may require storing historical data based on any previous compression lengths, any previous estimated/calculated compression ratios, and other parameters required to perform comparisons and decisions on whether the compression length should be adjusted and by how much it should be adjusted. The steps A1, A2 and A3 may be repeated on the same packet until the target CR is reached or until there is no further improvement in the compression gain. Alternatively or additionally, the steps A1, A2 and A3 may be repeated on one or more subsequent packets until the target CR is reached or until there is no further improvement in compression gain. The one or more subsequent packet(s) of the packet traffic may be at least one of a) another one or more consecutive packet(s) within the packet traffic, and/or b) another one or more packet(s) spaced apart within the packet traffic.

The steps of A1, A2 and A3 may be repeated a fixed number of times to avoid unnecessary delay in compressing packets. The steps of A1, A2, and A3 may be repeated a number of times for the same packet and/or for one or more subsequent packets until at least either a) the estimated CR reaches at least the target CR; b) the estimated CR is substantially the same as one or more previous estimated CR(s). In addition to repeating these steps over the same packet, and/or repeating these steps over one or more subsequent packets, these steps may also be repeated at periodic intervals. Alternatively or additionally, these steps may be repeated when the a newly estimated CR is found to deviate away from the previous estimated CR, or is worse than the target CR. Alternatively or additionally, these steps may be repeated when the estimated CR decreases to another previous lower estimated CR, or when the estimated CR deviates downwards from the target CR or the previously estimated CR by a certain ratio or threshold value.

Adjusting the compression length may include adjusting the compression length by a compression length step size. The compression length step size may be set to be a fixed value or increment that is added or subtracted from the compression length. Alternatively or additionally, the compression length step size may be set or adjusted to increase the likelihood the estimated CR reaches at least the target CR. For example, the compression length step size for adjusting the compression length may be determined as a function of one or more of any previous compression length(s), the estimated CR, the target CR, any previous estimated CR(s), the compression gain or any previous compression gain(s), headers and/or payload data of the packet, headers and/or payload data of at least a portion of the packet traffic, the type of packet traffic.

Figure 3B:
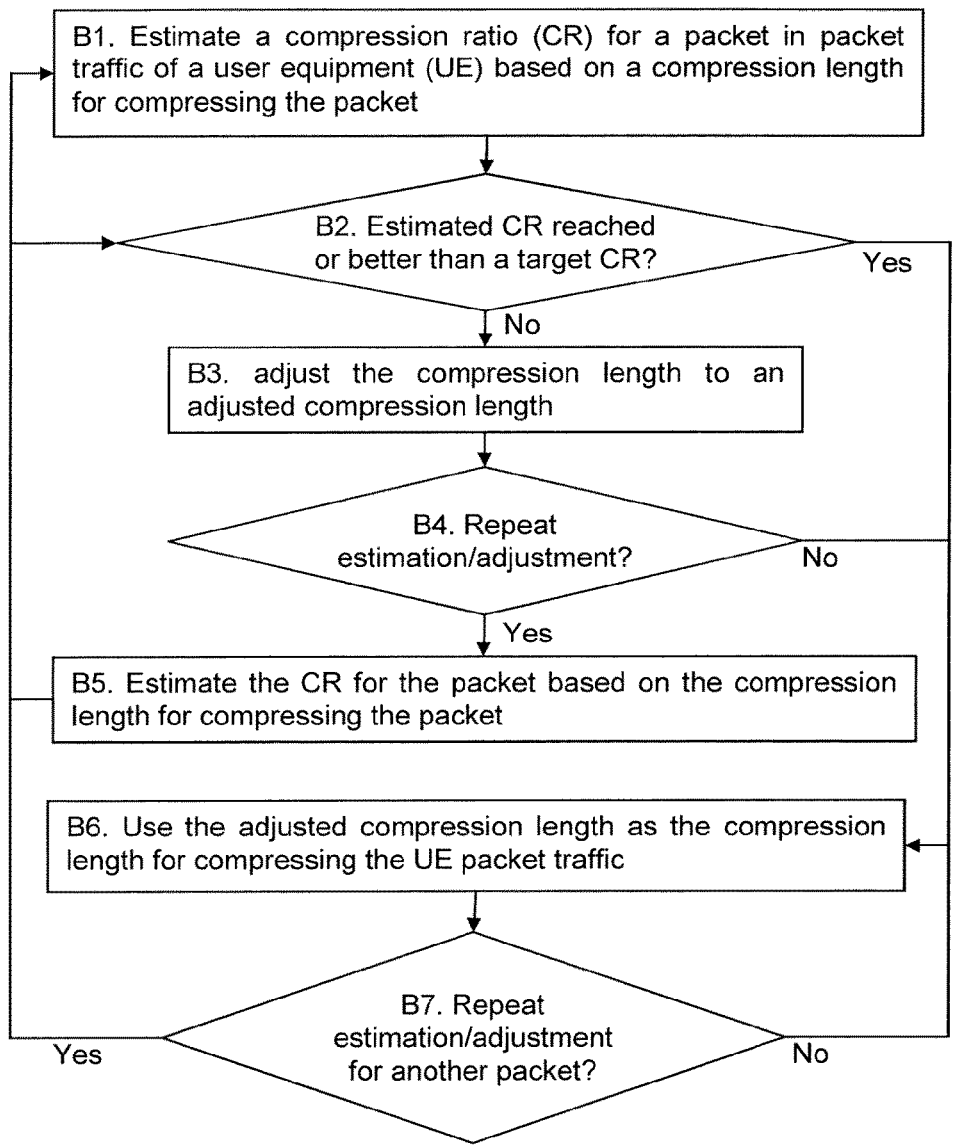
FIG. 3b is a flow diagram illustrating another example procedure carried out by an apparatus or method for use in compressing packets by iteratively estimating the compression length according to the invention.

FIG. 3b is another flow diagram illustrating another example procedure carried out by an apparatus or method(s) according to the invention for use in compressing packets by dynamically estimating/adjusting the compression length. The steps of the procedure or method are based on the following:

B1. Estimate/calculate a compression ratio (CR) for a packet in the packet traffic of a UE based on a compression length for compressing the packet.
B2. Compare the estimated CR with a target CR. If the estimated CR has reached the target CR or is better than the target CR, then proceed to step B7. Otherwise, proceed to step B3.
B3. Adjust the compression length to an adjusted compression length when the estimated CR has not reached at least the target CR.
B4. Determine whether to repeat the estimation, or adjustment. If it is determined that the estimation of the CR should be repeated or adjustment of the compression length is to be repeated, then proceed to step B5. Otherwise, proceed to step B6.
B5. Estimate the CR for the packet based on the compression length for compressing the packet. The compression length is based on the previously adjusted compression length. Proceed to B2.
B6. Use the adjusted compression length as the compression length for use in compressing the packet traffic or further packet traffic. This may include sending the compression length to the compressor unit for compressing the packet and/or subsequent packets.
B7. Determine whether the estimation/adjustment of the compression length should be repeated for another packet or a subsequent packet of the packet traffic of the UE. If the estimation/adjustment of the compression length is to be repeated, then proceed to step B1. Otherwise, proceed to step B6.

Step B4 may include a determination as to whether any further meaningful improvement in compression gain can be achieved (i.e. is the compression gain less than a compression gain threshold, if so, this may indicate no further improvement in adjusting the compression length is worthwhile or achievable). If any further meaningful improvement in compression gain is possible, then proceed to B5, otherwise proceed to B6. As an option, if no further adjustment in compression length is performed and the target CR has not been achieved, then the compression length used for compressing packets may be chosen from the current or any previous compression lengths that provide a good compromise between computational complexity and compression gain.

Step B7 may also include a determination as to whether the target CR has been reached or whether there is no further improvement in compression gain. The one or more subsequent packet(s) of the packet traffic may be at least one of a) another one or more consecutive packet(s) within the packet traffic, and/or b) another one or more packet(s) spaced apart within the packet traffic.

Optionally, step B4 may include a counter that is incremented until a packet threshold is reached for repeating the estimation/adjustment for the same packet. Before the counter reaches the packet threshold, the other performance factors such as target CR and compression gain may be used to determine whether to proceed to steps B5 or B6. Once the counter reaches the packet threshold, then the procedure may proceed to step B6. Similarly, step B7 may include another counter that is incremented until a packet count threshold is reached for repeating the estimation/adjustment for over subsequent packets. Before the counter reaches the packet count threshold, the other performance factors such as target CR and compression gain may be used to determine whether to proceed to steps B1 or B6. Once this counter reaches the packet count threshold, then the procedure may proceed to step B6. Each of the above counters may be reset and the procedure repeated again for subsequent packets or new packet traffic streams from the UE. The steps of this method may also be repeated at periodic intervals or when the estimated CR is found to deviate away or is worse than the target CR.

Step B3 and/or B4 may include determining whether to adjust the compression length based on one or more of the current compression length, the target compression ratio, any previous compression lengths, and any previous estimated compression ratios. Optionally, B3 may further include determining whether to increase or decrease the compression length as a function of one or more of the current compression length, the current target compression ratio, any previous compression length(s), any previous estimated compression ratios, headers of the packet, payload data of the packet, headers of the packet traffic, and payload of at least a portion of the packet traffic.

As a further option, the compression length may be adjusted by a compression length step size. Step B3 may further include adjusting the compression length step size to increase the likelihood the estimated compression ratio reaches at least the target compression ratio. Additionally or alternatively, B3 may further include determining the compression length step size for adjusting the compression length as a function of one or more of any previous compression length(s), the estimated compression ratio, the target compression ratio, any previous estimated compression ratio(s), headers and/or payload data of the packet, headers and/or payload data of at least a portion of the packet traffic. It is to be appreciated that this method may include storing the current compression length, the current estimated/calculated compression ratio, any previous compression lengths, any previous estimated/calculated compression ratios, and compression step sizes, any previous compressions gains, or other parameters or historical data for use, among other things and by way of example, in determining whether the compression length should be adjusted, by how much to adjust the compression length, whether the compression step size is to be adjusted and by how much it should be adjusted.

Optionally, when the packet is an uncompressed packet, steps B1 and/or B5 may include compressing the packet based on the compression length so that the compression ratio may be estimated. Alternatively or additionally, when the packet is a compressed packet, steps B1 and/or B5 may include decompressing the packet based on the compression length (typically included in the compressed packet, or sent over a side channel for decompressing the packet), and where the compression length based on the adjusted compression length is used by transmitting or sending the compression length to the compressor that compressed the packet for use in compressing further packets in the packet traffic.

Figure 3C:
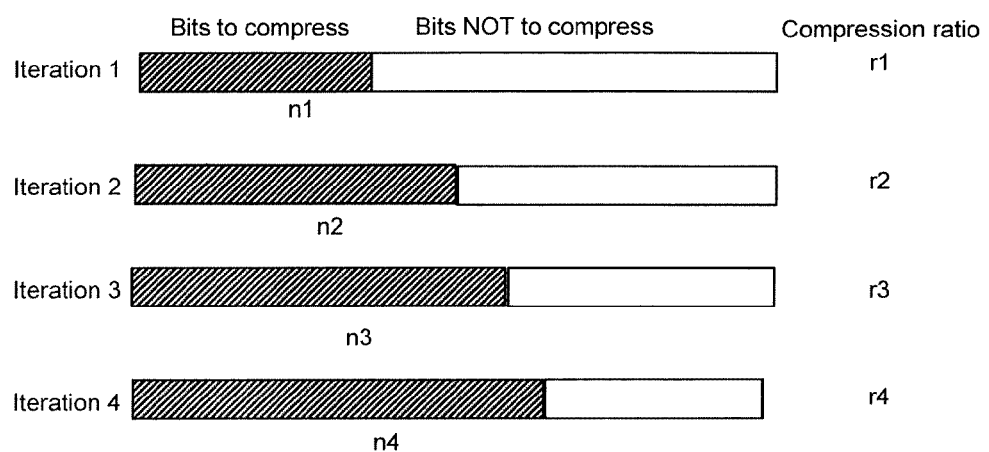
FIG. 3c is a schematic illustration of compressing packets according to the invention.

FIG. 3c is an schematic illustration for performing the method(s) as described with reference to FIG. 3a or 3b for optimising the compression length, N, of one or more packets. The methods of FIG. 3a or 3b may be iterated or repeated over the same packet or over one or more subsequent packets until the estimated CR meets a target CR or until there is no further improvement in compression gain. In this example, the compression length is set to a number of bits to compress. Initially, the compression length is set to a length of n1 bits to compress. The original size of the uncompressed packet is estimated, the packet is then compressed by the compression algorithm, which compresses n1 bits of the packet. The compression ratio r1 is then calculated based on the original packet size and the compressed packet size compressed by n1 bits (e.g. uncompressed packet size/compressed packet size when compression length of n1 bits). This is compared with the target CR. If the target CR is reached, then no further bits need be compressed and the compression length is used as the compression length for subsequent packets. However, in this example, the compression length, N, is adjusted a further three times from n2 to n4 on either the same packet or for one or more subsequent packets, where the estimated compression ratios r2 to r4 are compared to the target CR, and or the compression gain or the previous compression ratios are compared to determine whether further improvements in compression gain are feasible.

Figure 4A:
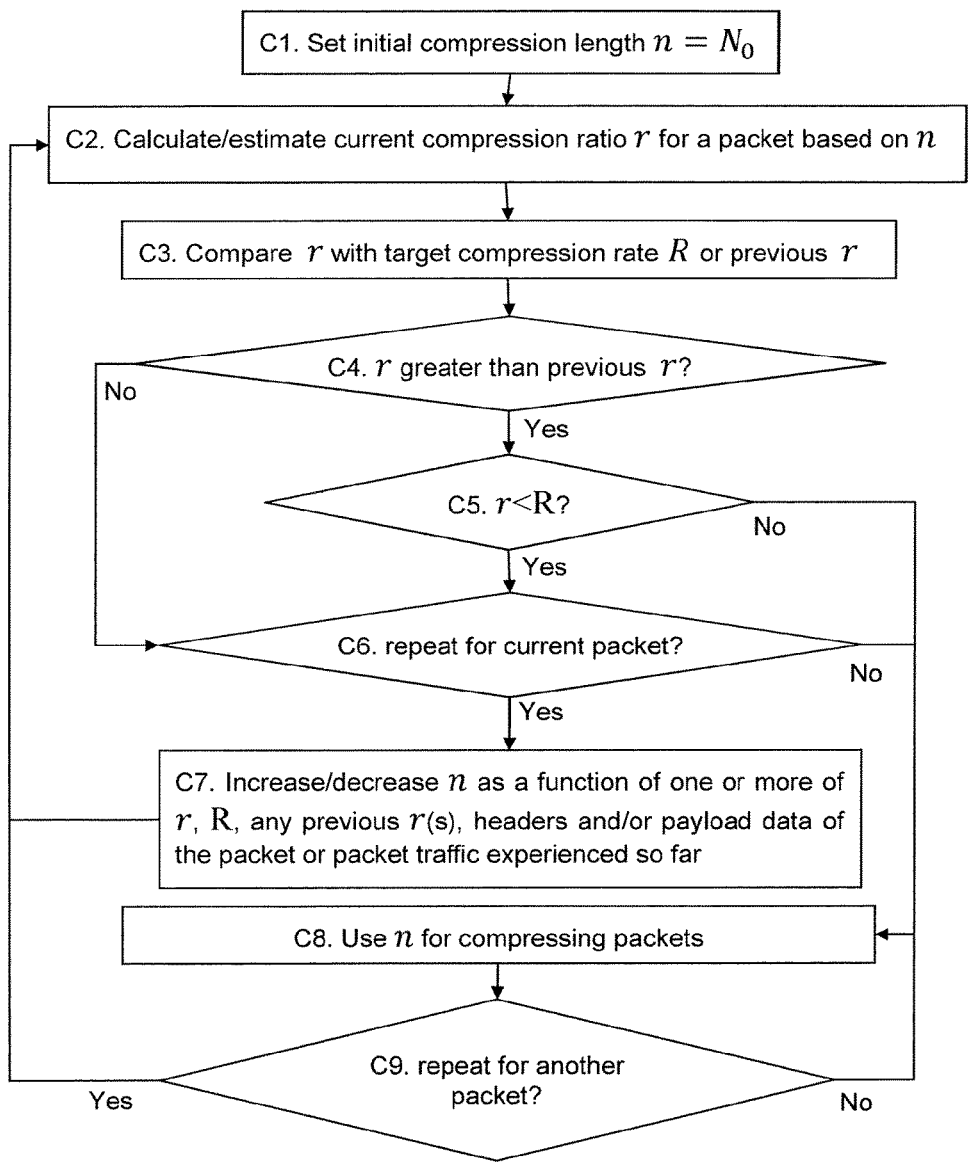
FIG. 4a is a flow diagram illustrating a further example procedure carried out by an apparatus or method for use in compressing packets by estimating the compression length according to the invention.

FIG. 4a is a flow diagram illustrating a further example procedure carried out by an apparatus or method(s) according to the invention for use in compressing packets of a UE or network entity by dynamically estimating/adjusting the compression length. The steps of the procedure or method are based on the following:

C1. Set an initial compression length to be $n=N_0$. This may be set from a previous compression length, or based on the type of packets that are being transmitted from the UE or network entity.

C2. Calculate/estimate the current compression ratio $r$ for a packet based on the compression length, n.

C3. Compare current $r$ with target compression rate R or previous $r$.

C4. If current $r$ is greater than previous $r$ ? then proceed to C5. Otherwise proceed to C6.

C5 If current $r$ <R ? then proceed to C6. Otherwise proceed to C8.

C6. Determine whether to repeat the adjustment of the compression length, n, for the current packet. If the adjustment is to be repeated, then proceed to C7. Oterise, proceed to step C8.

C7. Increase/decrease compression length $n$ as a function of one or more of current $r$, R, any previous $r$ (s), headers and/or payload data of the packet or packet traffic experienced so far. Proceed to step C2.

C8. Use the compression length $n$ for compressing the current packet or one or more subsequent packets of the packet traffic.

C9. Determine whether to repeat the adjustment of the compression length $n$ for another one or more packet(s). If it is determined that the compression length compression length $n$ should be adjusted, then proceed to step C2. Otherwise, proceed to step C8.

Initially, in step C1, the above procedure may first consider a default value for the compression length (i.e. the length of the data string to compress—this may be measured in bytes or bits or any other suitable data unit). For example, the compression length may be set to be $n=N_0$, which may be a configured value, e.g. based on knowledge about common header sizes, types of packets that may be transmitted etc. The compression length may also be configured from a starting value based on experience from earlier or parallel communication sessions.

Steps C3-C6 illustrates some of the criteria for whether the compression length n should be changed, which is related to the calculated/estimated compression ratio, $r$ and the target compression ratio R. This relates to how well the data of compression length n is being compressed. As previously described, the compression ratio may be defined as compression ratio, $r$, =uncompressed packet size/compressed packet size.

For example, step C4 may include determining the difference in absolute compression ratio between two compressed packets of different compression lengths. For example, the compressed packet of a previous iteration using the previous compression length and the compressed packet of the current iteration using the current compression length n. If the increase in the absolute compression ratio is larger than a threshold, K, then proceed to step C5 to check whether, $r$ <R, and also whether any further factors may affect the determination of adjusting the compression length n in step C6 If not, then proceed to step C7. In step C7, when the increase in the difference of the absolute compression ratio is larger than K, then increase compression length n for next iteration or the next packet.

However, in step C4, if the difference in absolute compression ratio increase is between 0 and the threshold K, then it may be determined that the compression length n should not be adjusted so the procedure proceed to step C6, to check for any other factors for repeating the iteration for the current packet. If not, then proceed to C8, otherwise proceed to C7.

However, in step C4, if the difference in absolute compression ratio is negative (which is a decrease), then the compression length n could be decreased in step C7.

The above example regarding step C4 could instead apply the derivative of the compression ratio between two compressed packets of different compression lengths. For example, when the derivative (i.e., the speed of change of the compression ratio $r$) is positive, the compression length n may be increased, when the derivative is equal to 0 the compression length n may be kept the same, and when the derivative is negative the compression length n may be decreased.

In step C5, the current compression ratio $r$, is compared to the target compression ratio R. If the "normal" compression ratio is known (from a priori knowledge or from observing earlier sessions), it is possible to increase the compression length until the target compression ratio is reached. The fulfillment can be measured either as absolute compression ratio, or as a fraction of the target compression ratio.

In step C7, the compression length n may be increased or decreased. These changes in compression length n may be linear or non-linear. For example, the compression length n can be increased starting from a compression length step size m of value A, or decreased from another starting compression length step size m of value B, where B>A. In another example, the compression length step size m by which the compression length n may be changed, could both increase and decrease.

The compression length step size m may change based on various different strategies depending on whether the compression length n is increasing or decreasing (or not changing between following packets). For example, the compression length step size m could be set to a fixed size M such that increasing or decreasing the compression length n length is performed in steps of M. Additionally or alternatively, the compression length step size m may follow a non-linear function, for example, the compression length step size m may be set proportional to the size of the compression length n (e.g. the compression length step size m may be set to a small value whenever the compression length n is set to a small value, and the compression length step size m may be set to a larger value when the compression length n is set to a larger value.) Additionally or alternatively, the compression length step size m may be based on knowledge about the order of the data, e.g. order and sizes of packet headers, and higher layer protocol payload data. In addition, the compression length step size m may also be determined adaptively, where it can be increased/decreased based on the changes in other factors, by way of example only, such as compression ratio or compression gain.

It is to be appreciated that this method may include storing the current compression length n, the current compression ratio $r$, any previous compression lengths, any previous estimated/calculated compression ratios, and compression step sizes, any previous compressions gains, or other parameters for use, among other things and by way of example only, in determining whether the compression length n should be adjusted, by how much to adjust the compression length, whether the compression step size m is to be adjusted and by how much it should be adjusted.

Figure 4B:
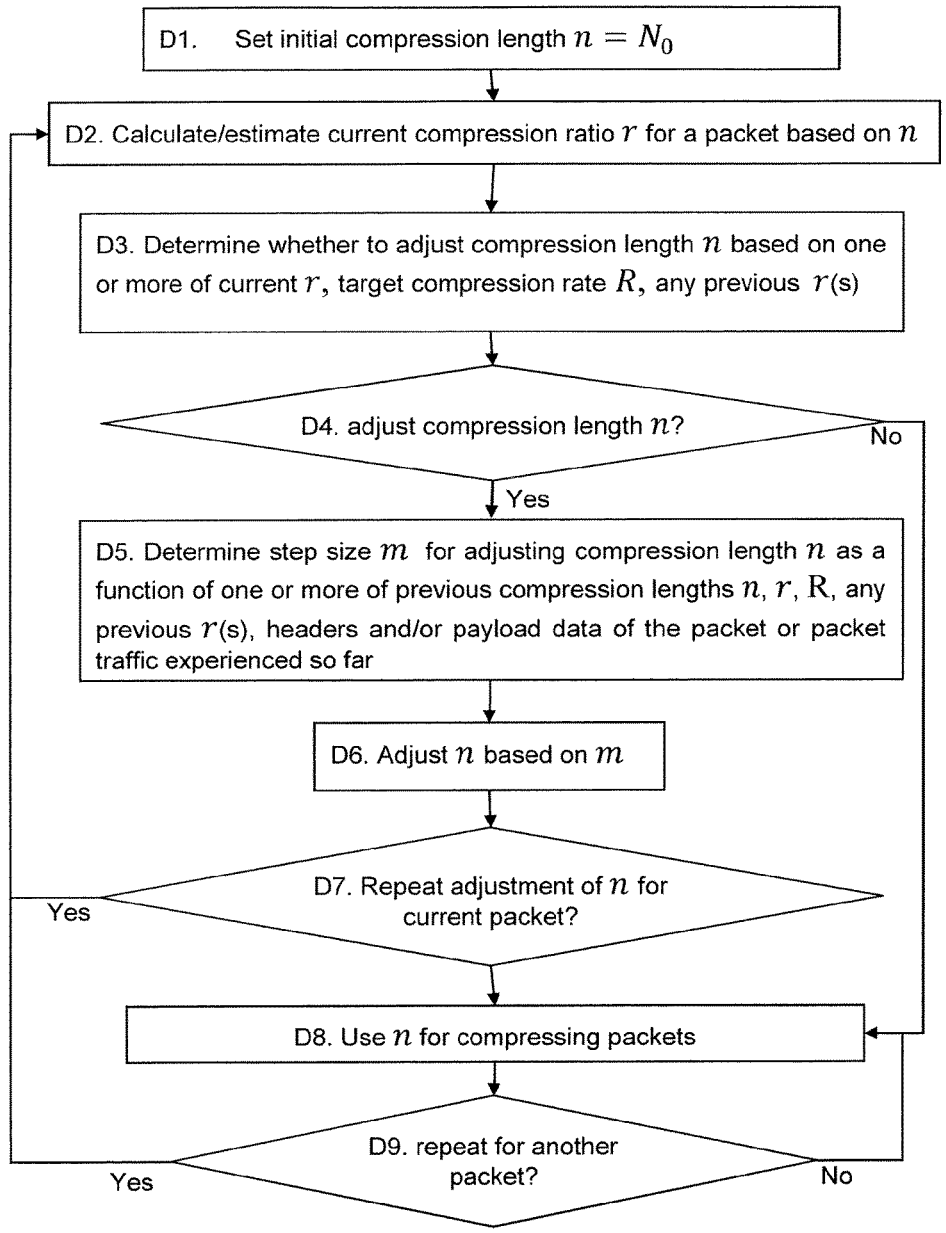
FIG. 4b is a flow diagram illustrating yet another example procedure carried out by an apparatus or method for use in compressing packets by estimating the compression length according to the invention

FIG. 4b is another flow diagram illustrating yet a further example procedure carried out by an apparatus or method(s) according to the invention for use in compressing packets of a UE or network entity by dynamically estimating/adjusting the compression length. The steps of the procedure or method are based on the following:

D1. Set an initial compression length to be n=$N_0$. This may be set from a previous compression length, or based on the type of packets that are being transmitted from the UE or network entity.

D2. Calculate/estimate the current compression ratio $r$ for a packet based on the compression length, n.

D3. Determine whether to adjust the compression length, n, based on one or more of the current compression ratio $r$, the target compression rate R, or any previous $r$ (s).

D4. If the compression length, n, is determined to be adjusted, then proceed to D5, otherwise proceed to D8.

D5. Determine the compression step size m for adjusting compression length n as a function of one or more of previous compression lengths n, $r$, R, any previous $r$ (s), headers and/or payload data of the packet or packet traffic experienced so far. Proceed to step D6.

D6. Adjust the compression length, n, based on the determined compression step size M.

D7. Repeat the adjustment of the compression length, n, for the current packet? If so, then proceed to step D2. Otherwise, proceed to step D8.

D8. Use the compression length $n$ for compressing the current packet or one or more subsequent packets of the packet traffic.

D9. Determine whether to repeat the adjustment of the compression length $n$ for another one or more packet(s) of the packet traffic. If it is determined that the compression length compression length $n$ should be adjusted, then proceed to step D2. Otherwise, proceed to step D8.

Initially, in step D1, as described for the previous procedure, a default value for the compression length may be set. For example, the compression length may be set to be n=$N_0$, which may be a configured value, e.g. based on knowledge about common header sizes, types of packets that may be transmitted etc. The compression length may also be configured from a starting value based on experience from earlier or parallel communication sessions.

Step D3 performs a determination of whether the compression length n should be adjusted or changed. This is related to many factors some of which, by way of example only, are based on the calculated/estimated compression ratio, $\hat{r}$ and the target compression ratio R, and any previous calculated/estimated compression ratio(s) r(s).

For example, step D3 may include simply comparing the calculated/estimated current compression ratio, $\hat{r}$, with the target compression ratio R as previously described or comparing the current estimated compression ratio, $\hat{r}$, with any previously calculated/estimated compression ratio to determine whether the compression length n should be adjusted.

As an option, step D3 may determine whether the compression length n should be adjusted by determining the difference in absolute compression ratio between two compressed packets of different compression lengths. For example, the compressed packet of a previous iteration using the previous compression length and the compressed packet of the current iteration using the current compression length n. If the increase in the absolute compression ratio is larger than a threshold, K, then this triggers the determination that the compression length n should be adjusted, so the procedure proceeds to step D4 and then to step D5, where the step compression length step size m is determined, as the increase in the difference of the absolute compression ratio is larger than K, then compression length n will be increased by the determined step size m.

However, in step D3, if the difference in absolute compression ratio increase is between 0 and the threshold K, then it may be determined that the compression length n should not be adjusted so the procedure proceed to step D4 and onto step D8.

However, in step D3, if the difference in absolute compression ratio is negative (which is a decrease in compression ratio), then the compression length n is determined to be requiring adjustment and could be decreased, so the procedure proceeds to step D5 via D4 for the determination of the compression length step size m for decreasing the compression length.

The above example regarding step D3 and D4 could instead apply the derivative of the compression ratio between two compressed packets of different compression lengths. For example, when the derivative (i.e., the speed of change of the compression ratio $\hat{r}$) is positive, then it is determined adjustment of the compression length n is needed and the compression length n may be increased in step D5. When the derivative is equal to 0 it is determined the adjustment of the compression length n is not required, and so the compression length n may be kept the same and the procedure proceeds via D4 to D8. When the derivative is negative, then it is determined that adjustment of the compression length n is required, and the compression length n may be decreased in step D5.

In step D3 may further include determining whether the compression length n should be adjusted by comparing the current compression ratio $\hat{r}$, with the target compression ratio R. If the "normal" compression ratio is known (from a priori knowledge or from observing earlier sessions), it is possible to increase the compression length n until the target compression ratio R is reached. The fulfillment can be measured either as absolute compression ratio, or as a fraction of the target compression ratio R.

In step D5, the compression length step size m is determined for increasing/decreasing the compression length n. The changes in compression length n may be linear or non-linear. For example, the compression length n can be increased starting from a compression length step size m of value A, or decreased from another starting compression length step size m of value B, where B>A. In another example, the compression length step size m, by which the compression length n may be changed, could increase and/or decrease depending on the changes in compression ratios, compression gains, etc.

For example, the compression length step size m may change based on various different strategies depending on whether the compression length n is increasing or decreasing (or not changing between following packets). For example, the compression length step size m could be set to a fixed size M such that increasing or decreasing the compression length n length is performed in steps of M. Additionally or alternatively, the compression length step size m may follow a non-linear function, for example, the compression length step size m may be set proportional to the size of the compression length n (e.g. the compression length step size m may be set to a small value whenever the compression length n is set to a small value, and the compression length step size m may be set to a larger value when the compression length n is set to a larger value.) Additionally or alternatively, the compression length step size m may be based on knowledge about the order of the data, e.g. order and sizes of packet headers, and higher layer protocol payload data. In addition, the compression length step size m may also be determined adaptively, where it can be increased/decreased based on the changes in other factors, by way of example only, such as compression ratio or compression gain.

It is to be appreciated that this method may include storing the current compression length n, the current compression ratio $\hat{r}$, any previous compression lengths, any previous estimated/calculated compression ratios, and compression step sizes, any previous compressions gains, or other parameters for use, among other things and by way of example only, in determining whether the compression length n should be adjusted, by how much to adjust the compression length, whether the compression step size m is to be adjusted and by how much it should be adjusted.

As mentioned previously described for the methods as described with reference to FIGS. 2(a) to 4(b), the compression ratio as used herein is defined as compression ratio=uncompressed packet size/compressed packet size. The compression ratio may typically be calculated for each compressed data packet, but it is also possible to calculate the compression ratio, and thus also adjust the compression length, every X packets (i.e., not each and every packet), but every X packets spaced apart. The period for compression ratio calculation and hence determination of whether the compression length should be adjusted may be fixed.

Alternatively or additionally, this period may change depending on the circumstances. For example, the method(s) may be performed using a higher packet frequency when the estimated compression ratio is getting close the target compression ratio. In another example, the method(s) may be performed using a high packet frequency when the process is starting up on a new communication session, and then decrease in frequency when reaching some "stable" state. Additionally or alternatively, it is also possible to calculate the compression ratio in real time before releasing the packet from the compressor unit, and thus adjust the compression length within the processing time of the same packet, that is two or more iterations of the method(s) as described herein are performed on the same packet. For example, Y may be a value indicating the number of compression length adjustments that should be made per packet. This means the calculation of compression ratio and/or increase of compression length of the byte/bit string to compress can be performed for each transmitted packet, for each M transmitted packets, or using a time periodicity T.

The compression length of the byte/bit string to compress can be calculated and used for each UE packet flow, session, radio access bearer (RAB), UE/terminal, radio network controller (RNC) and/or other network entity (like cell or roaming area or similar). The frequency for which the compression length of the byte/bit string to compress is calculated/updated can be for each new UE packet flow, session, or RAB, or new UE activation, or once per RNC or other network entity, or with certain periodicity (e.g., every Tk seconds) or triggered by the calculated compression ratio (e.g., when compression ratio r gets below a certain gain, a new share is calculated).

Other modifications of the invention may include incrementing the compression length performed by the method(s) until no further compression gain is achieved, and/or until the target compression ratio is achieved. The compression length, if deemed too high due to delays in compressing packets or computational complexity, may be reduced to achieve a more dynamic adaption of the compression length. In the case where the compression length is allowed to both increase and/or decrease during a communications session or packet flow, the decision to decrease or increase may be restricted further by various procedures such as applying a hysteresis on the target compression gain or ratio, or clamping the compression length to the full packet length if the adjusted or calculated value of the compression length is close to the full packet length.

It is noted, the methods and procedures as herein described should operate for packet sizes significantly larger than $N_0$, e.g. sizes $N_0+G$, because for packets smaller than this size it will be more efficient to immediately compress their entire content.

The method(s) and subsequent analysis may be performed in apparatus in either the network or in the UE, e.g. in the compressor unit or in the de-compressor unit of the corresponding network entity or UE. The compression length that is used to compress the byte/bit string of each packet may be signaled between the compressor/de-compressor units using a signaling protocol (e.g. side channel signaling), or the compression length may be inserted in a compression header (an additional overhead added to each data packet, stating information like compression version, CRC checksum for reliability etc.) for each packet, or for each packet when the compression length changes.

Figure 5A:
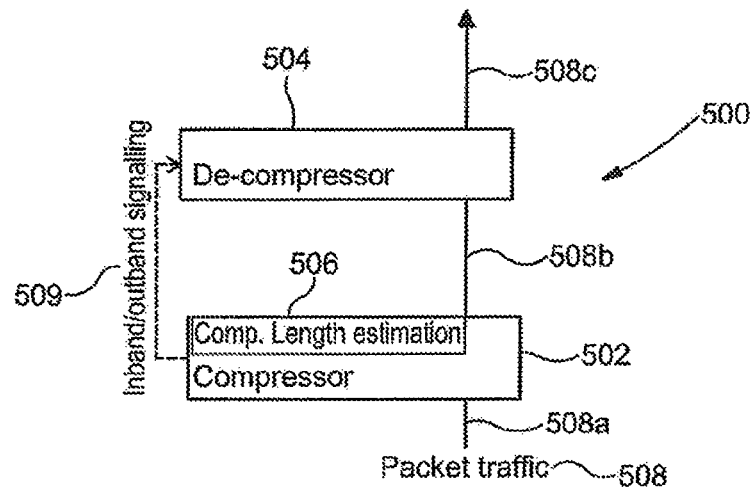
FIG. 5a is a schematic illustration of an example compressor unit for performing compression length estimation according to the invention.

FIG. 5a is a schematic illustration of a communication system 500 including a compressor unit 502 and a decompressor unit 504 for compressing/decompressing packets of packet traffic from a UE (not shown). In this example, the compressor unit 502 is configured to perform compression length estimation according to the invention. The compressor unit 502 includes a compression length estimation apparatus or unit 506, which is adapted to perform any of the method(s) or procedure(s) as described herein, or those with reference to FIGS. 2(a) to 4(b). The compressor unit 502 may be located within a UE (not shown) that may generate uncompressed packets 508a during a communications session for transmission over a network. The decompressor unit 504 may be located within a network element or entity (not shown) within the communication system or within another UE.

In operation, the compressor unit 502 receives the uncompressed packets 508a and compresses these packets 508a using a compression algorithm and a compression length as determined by the compression length estimation apparatus 506. The compressed packets 508b are transmitted over the network and received by a decompressor unit 504, which decompresses the compressed packets 508b based on the compression length determined by the compression length estimation apparatus 506. The decompressor unit 504 may forward the decompressed packets 508c to another UE or another network entity or another compression unit (not shown) in another network entity or UE for compression and forwarding on in the network.

The compression length that is determined by the compression length estimation apparatus 506 and used by the compressor unit 502 may be inserted into the header of the compressed packets 508b to enable the decompressor unit 504 to decompress these packets. Alternatively, the compression length that is determined by the compression length estimation apparatus 506 may be sent towards the decompressor unit 504 using inband/outband signalling 509.

Figure 5B:
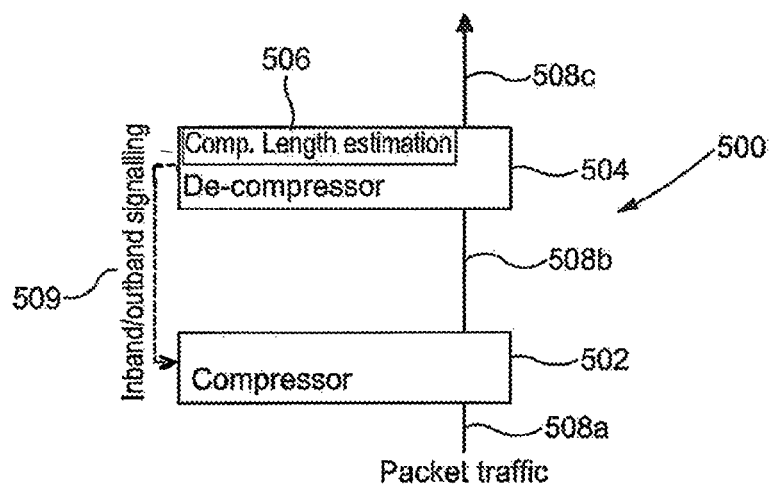
FIG. 5b is a schematic illustration of another example decompressor unit for performing compression length estimation according to the invention.

FIG. 5b is another schematic illustration of a communication system 500 including a compressor unit 502 and a decompressor unit 504 for compressing/decompressing packets of packet traffic from a UE (not shown). In this example, the decompressor unit 504 is configured to perform compression length estimation according to the invention. The decompressor unit 504 includes the compression length estimation apparatus or unit 506, which is adapted to perform any of the method(s) or procedure(s) as described herein, or those with reference to FIGS. 2(a) to 4(b). The compressor unit 502 may be located within a UE (not shown) that may generate uncompressed packets 508a during a communications session for transmission over a network. The decompressor unit 504 may be located within a network element or entity (not shown) within the communication system or within another UE.

In operation, the compressor unit 502 receives the uncompressed packets 508a and compresses these packets 508a using a compression algorithm and a compression length as determined by the compression length estimation apparatus 506. The compression length may be communicated from the compression length estimation apparatus 506 in the decompressor unit 504 to the compressor unit 502 via inband/outband signalling 509. The compressed packets 508b are transmitted over the network and received by the decompressor unit 504, which decompresses the compressed packets 508b based on the compression length determined by the compression length estimation apparatus 506. The decompressor unit 504 may forward the decompressed packets 508c to another UE or another network entity or another compression unit (not shown) in another network entity or UE for compression and forwarding on in the network.

As the compression length estimation apparatus 506 is located in the decompressor unit 504, the number of iterations of the method used for adjusting the compression length may be applied over several packets instead of having multiple iterations per packet—this is because estimating the compression ratio based on an adjusted compression length requires compression of the packet. The compression length that is determined by the compression length estimation apparatus 506 and used by the compressor unit 502 is simply feed back to the compressor unit 502 from the decompressor unit 504 for compressing subsequent packets of the packet traffic from the UE etc. The compression length that is determined by the compression length estimation apparatus 506 may be sent towards the compressor unit 502 using inband/outband signalling 509.

Figure 6A:
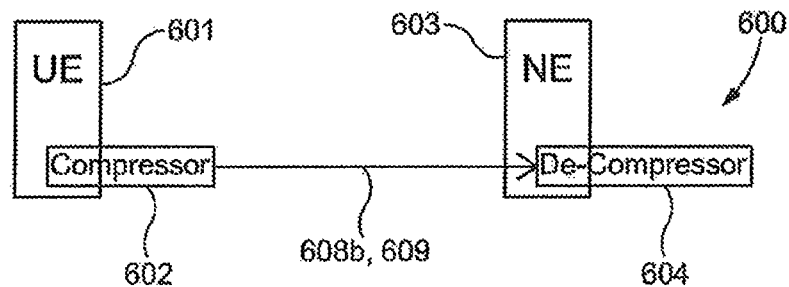
FIG. 6a is a schematic illustration of an example system for performing compression length estimation according to the invention.

FIG. 6a is a schematic illustration of another example communication system 600 for performing compression length estimation according to the invention. The communication system 600 includes a UE 601 and a network entity 603. The UE 601 includes the functionality of a compressor unit 602 for compressing packets generated by the UE 601 into compressed packets 608b during, for example, a communication session. The network entity 603 includes the functionality of a decompressor unit 604 for decompressing the compressed packets 608b.

As described with reference to FIGS. 5(a) and 5(b), the compressor unit 602 of the UE 601 or the decompressor unit 604 of the network entity 603 may include the functionality of the compression length estimation apparatus 506 according to the invention and use the determined or resulting compression length for compressing/decompressing packets during the communication session.

For example, the UE 601 may include a processor, receiver and transmitter (or transceiver) and storage or memory unit (e.g. memory unit, computer readable medium, random access memory, read-only memory, flash drive, etc.), where the processor is connected to the receiver, transmitter and memory unit. The memory unit may be configured to include the functionality of the compressor unit 602 and/or the decompressor unit 604, and also the functionality of the compression length estimation apparatus 506. The processor, receiver and transmitter (or transceiver), and memory unit are adapted to perform the functions of the compressor unit 602 and/or the decompressor unit 604, and the compression length estimation apparatus 506.

The network entity 603 may also include a processor, receiver and transmitter (or transceiver) and storage or memory unit (e.g. memory unit, computer readable medium, random access memory, read-only memory, flash drive, disk drive etc.), where the processor is connected to the receiver, transmitter and memory unit. The memory unit may be configured to include the functionality of the compressor unit 602 and/or the decompressor unit 604, and also the functionality of the compression length estimation apparatus 506. The processor, receiver and transmitter (or transceiver), and memory unit are adapted to perform the functions of the compressor unit 602 and/or the decompressor unit 604, and the compression length estimation apparatus 506.

Figure 6B:
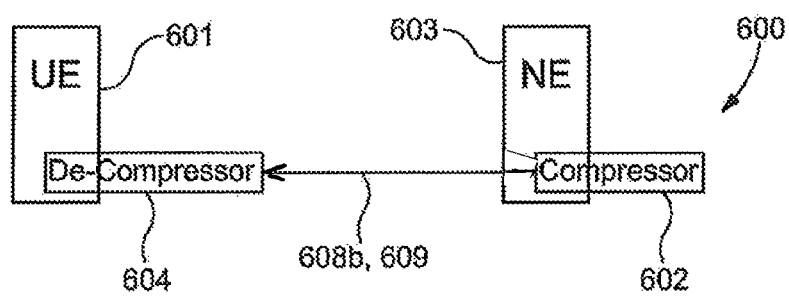
FIG. 6b is a schematic illustration of another example system for performing compression length estimation according to the invention.

FIG. 6b is another schematic illustration of a further example communication system 600 for performing compression length estimation according to the invention. The communication system 600 includes a UE 601 and a network entity 603. The UE 601 includes the functionality of a decompressor unit 604 for decompressing packets generated by another UE (not shown) or by network entity 603 that have been compressed into compressed packets 608b during, for example, a communication session. The network entity 603 includes the functionality of a compressor unit 602 for compressing uncompressed packets into compressed packets 608b.

As described with reference to FIGS. 5(a) and 5(b), the decompressor unit 604 of the UE 601 or the compressor unit 602 of the network entity 603 may include the functionality of the compression length estimation apparatus 506 according to the invention and use the determined or resulting compression length for compressing/decompressing packets during the communication session.

Figure 6C:
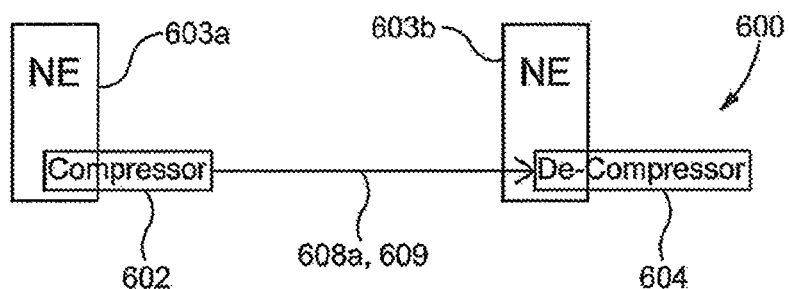
FIG. 6c is a schematic illustration of a further example system for performing compression length estimation according to the invention.

FIG. 6c is yet a further schematic illustration of yet a further example communication system 600 for performing compression length estimation according to the invention. The communication system 600 includes a network entity 603a and a network entity 603b. The network entity 603a includes the functionality of a compressor unit 602 for compressing uncompressed packets generated by another UE (not shown) or by network entity 603a into compressed packets 608b during, for example, a communication session. The network entity 603b includes the functionality of a decompressor unit 604 for decompressing compressed packets into uncompressed packets.

As described with reference to FIGS. 5(a) and 5(b), the compressor unit 602 of the network entity 603a or the decompressor unit 604 of the network entity 603b may include the functionality of the compression length estimation apparatus 506 according to the invention and use the determined or resulting compression length for compressing/decompressing packets during the communication session.

Figure 7:
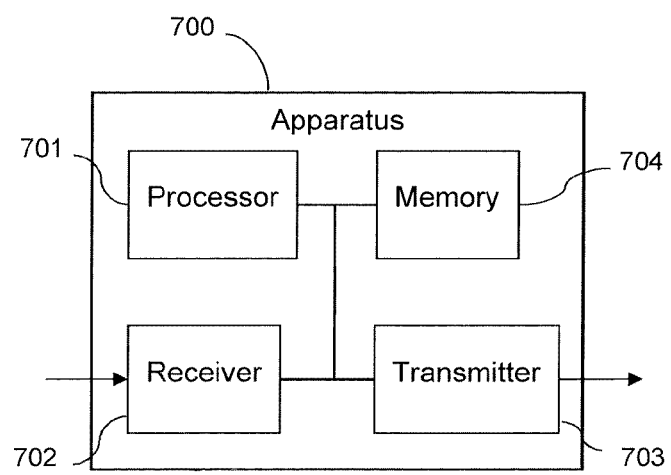
FIG. 7 is a schematic illustration of an apparatus for use with the method(s) and apparatus according to the invention.

FIG. 7 is a schematic illustration of an apparatus 700 for use with the method(s) and apparatus according to the invention for estimating and adjusting the compression length for compressing packets of UE packet traffic. The apparatus 700 is for use when compressing packet traffic associated with a UE. The apparatus 700 may be for use in or with a compressor unit or in or with a decompressor unit of one or more UE(s) and/or one or more network entity(ies) in a communications network, the communications network including a RAN and a wireless network. The apparatus 700 may include a processor 701, a receiver 702, a transmitter 703 and a memory 704, the processor 701 being coupled to the receiver 702, the transmitter 703 and the memory 704. The processor 701, receiver 702, the transmitter 703, and the memory 704 may actually be the processor, receiver, transmitter and memory of a UE or a network entity such that the UE and/or network entity includes the functionality of the apparatus 700. The receiver 702 and/or the transmitter 703 may be configured for communicating with the compressor units and/or decompressor units of the UEs and/or network entities in the wireless network. In addition or alternatively, the receiver 702 and transmitter 703 may be in the form of one or more transceivers capable of communicating with the compressor unit/decompressor unit of the UE(s) and/or network entities over a bus or a radio access network and/or network entities of the network and/or other UEs.

The memory 704 may include the methods and functions of the systems and/or apparatus for compressing packets and estimating compression ratios, adjusting compression lengths for use in compressing said packets according to the invention as described above and/or described with reference to FIGS. 2(a) to 6(c). The memory 704 may further include compression/decompression algorithm(s) that causes the processor 701 to perform compression/decompression on the appropriate packets using the compression length. The memory 704 may further include applications or programs for performing the functions of the compression length adjustment and estimation as described herein.

In operation, the apparatus 700 is adapted to estimate a compression ratio for a packet in the packet traffic based on a compression length for compressing the packet, compare the estimated compression ratio with a target compression ratio, adjust the compression length when the estimated compression ratio has not reached at least the target compression ratio, and use or send the adjusted compression length as the compression length for compressing the packet traffic.

As an option, the apparatus 700 is further adapted to repeat the estimation, comparison and djustment of the compression length for the packet until the estimated compression ratio reaches at least the target compression ratio. Additionally or alternatively, the apparatus 700 may be further adapted to repeat the estimation, comparison and adjustment of the compression length for another one or more packets in the packet traffic until the estimated compression ratio reaches at least the target compression ratio. As an option, the another one or more packets of the packet traffic comprises at least one of: a) another one or more consecutive packet(s) within the packet traffic, and/or b) another one or more packet(s) spaced apart within the packet traffic.

Optionally, the apparatus 700 may be further adapted to repeat the estimation, comparison and adjustment of the compression length a fixed number of times. Additionally or alternatively, the apparatus 700 may be further adapted to repeat the estimation, comparison and adjustment of the compression length is based on at least one of a) the estimated compression ratio reaching at least the target compression ratio; b) the estimated compression ratio being substantially the same as one or more previous estimated compression ratio(s); c) the change in compression gain from a previous iteration of the estimation, comparison and adjustment being less than a compression gain threshold value.

As an option, the apparatus 700 may be further adapted to repeat the estimation, comparison and adjustment of the compression length at periodic intervals. As a further option, the apparatus 700 may be further adapted to determine whether to adjust the compression length based on one or more of the current compression length, the target compression ratio, any previous compression lengths, and any previous estimated compression ratios.

Optionally, the apparatus 700 may be further adapted to adjust the compression length by determining whether to increase or decrease the compression length as a function of one or more of the current compression length, the current target compression length, any previous compression length(s), any previous estimated compression ratios, headers of the packet, payload data of the packet, headers of the packet traffic, and payload of at least a portion of the packet traffic.

As a further option, the apparatus 700 may be further adapted to adjust the compression length by a compression length step size. Alternatively or additionally, the apparatus 700 may be further adapted to adjust the compression length step size to increase the likelihood the estimated compression ratio reaches at least the target compression ratio. As an option, the apparatus 700 may be further adapted to determine the compression length step size for adjusting the compression length as a function of one or more of any previous compression length(s), the estimated compression ratio, the target compression ratio, any previous estimated compression ratio(s), headers and/or payload data of the packet, headers and/or payload data of at least a portion of the packet traffic.

As an option, the apparatus 700 may be adapted, when the packet is an uncompressed packet, to estimate the compression ratio by compressing the packet based on the compression length before estimating the compression ratio. The apparatus may use the compression length by sending the compression length based on the adjusted compression length to the compressor that compressed the packet for use in compressing further packets in the packet traffic. Alternatively or additionally, the apparatus 700 may be adapted, when the packet is a compressed packet, to estimate the compression ratio by decompressing the packet based on the compression length before estimating the compression ratio, and to use the compression length by transmitting or sending the compression length based on the adjusted compression length to a compressor that compressed the packet for use in compressing further packets in the packet traffic.

The apparatus 700 may be further adapted to implement the steps of the methods or procedures as described with reference to FIGS. 2(a) to 6(c) or any combination of any such steps thereof or as described.

Further modifications of the invention as provided by the method(s), procedure(s), apparatus, UE(s), network entity(ies), compressor(s)/decompressor(s) as described with reference to FIGS. 2(a) to 7 may be made. For example, the estimation, comparison, and adjustment in compression length can be made either in the network or in the UE, in the compressor or in the de-compressor. The compression length of the byte or bit string to be compressed that is used to compress a packet may be signalled between the compressor/de-compressor using a signalling protocol, or inserted in a compression header of one or more compressed packets (an additional overhead added to each data packet, stating information like compression version, CRC checksum for reliability etc.), such that the compressed packets may be decompressed by a decompressor based on the compression length.

In addition, the iterative procedure for adjusting the compression length when compressing one or more packets of packet traffic may stop prematurely (from the viewpoint of optimal compression rate) if there is a common sequence of bytes in the packet(s) that are 'uncompressible', followed by a substantial string of compressible data. Therefore, if such packet content is found or suspected to be common in the packet traffic, the above example methods, procedures and apparatus may further include additional steps or features that may or may not be used depending on the likelihood that such packet content occurs, computational or processing load or implementation complexity. For example, such additional steps or features may include implementing periodic compression of entire packets to get an estimate of the achievable compression ratio or rates. Alternatively or additionally, an addition step or feature may include adaptively using different values for the compression step size to increment or adjust the compression length. Additionally or alternatively, one or more of the packets may be analysed to identify the compressible portions of the packet and only compressing the identified compressible portions of the packet based on the compression length. Further features may include analysing partial compressibility of packets and only act on fractions of the byte/bit string of the packet to be compressed. Other features may include starting from the end of the packet and compressing backwards towards the beginning of the packet, or compressing the header and other compressible parts of the packet up to or based on the compression length.

Furthermore, the method(s), procedure(s), apparatus, UE(s), network entity(ies), compressor(s)/decompressor(s) according to the invention and as described herein or described with reference to FIGS. 2(a) to 7 may be implemented within various radio protocols or standards) (e.g. Third Generation Partnership (3GPP) radio protocols or standards) and/or may be implemented at various parts of the network layers above the radio protocol layer, (e.g. in software such as the operating system of a UE or network entity) or in the application layer of the protocol stack.

Although there have been several examples in which the invention has been described for illustrative purposes only, and by way of example only, using packets based on the transport protocol layer e.g. (e.g. IP header and TCP/UDP header and payload), it is to be appreciated by the person skilled in the art that the invention as described herein and defined by the claims is protocol agnostic and may be applied to any packet based on any format or any protocol, and is not to be regarded as limited for use with only transport protocols and packets thereto.

It is to be appreciated that the methods, apparatus, network entities, compressors/decompressors, and UEs may be associated with a variety of packet networks, which may include, but are not limited to previous PS network generations (2G, 2.5G, and 3G) such as UMTS, Wideband Code Division Multiple Access networks, Third Generation Partnership (3GPP) networks, W-Fi networks, enhanced PS networks based on LTE or LTE-Advanced systems, all IP networks, networks based on the EPS, which include an EPC that forms the basis of the core PS network for the all IP network, and future PS network generations such as 4G and beyond or combinations thereof.

The systems, apparatus, network entities, compressors/decompressors and/or UEs as described herein each may perform or contribute to one or more of the compression/decompression of packet traffic, estimating compression ratios and comparing against appropriate measures, determining whether the compression length for the packet traffic should be adjusted, and adjusting the compression length to an adjusted compression length for use in compressing/decompressing packets being communicated in a network. The processors of such systems may be configured to execute computer program instructions based on the methods and processes described herein, such instructions being contained in a non-transitory computer-readable medium, such as memory. The computer program instructions may be read into memory from another computer-readable medium or from another device via a communication interface. The instructions contained in memory cause the processor of a system, apparatus, network entities, and/or UEs or other such computer system to perform processes or methods as described herein.

There may be provided a computer program, including instructions which, when executed on at least one processor, cause the at least one processor to carry out the method for use in compressing packets as described herein, or with reference to FIGS. 1 to 7. There is also provided a carrier containing the computer program of, wherein the carrier is one of an electronic signal, optical signal, radio signal, computer readable storage medium, or non-transitory computer readable medium. Alternatively or in addition to, hardwired circuitry may be used in place of or in combination with the computer program instructions to implement processes and methods consistent with the present invention. Examples of hardware circuitry may include, but are not limited to, semiconductor chips, integrated circuits, field programmable gate arrays, application-specific integrated circuits, electronically programmable integrated circuits and the like. Thus, the present invention is not limited to any specific combination of hardware circuitry and/or software.

The non-transitory computer readable medium may include computer program instructions stored thereon, which when executed on one or more processors of a server, server system, or other computing system, performs the processes or method steps of one or more of the functions of estimating/calculating the compression ratio of packets based on the compression length, determining whether the compression length should be adjusted, and adjusting the compression length for use in compressing/decompressing the packets of the packet traffic being communicated in a network as described herein with reference to FIGS. 1 to 7.

Although the invention has been described in terms of preferred embodiments as set forth above, it should be understood that these embodiments are illustrative only and are not limited only to those embodiments. Those skilled in the art will be able to make modifications and alternatives in view of the disclosure which are contemplated as falling within the scope of the invention as described. Each feature disclosed or illustrated in the present specification may be incorporated in the invention, whether alone or in any appropriate combination with any other feature disclosed or illustrated herein.

The invention claimed is:

1. A method for compressing packet traffic associated with a user equipment in a network, the method comprising:
    estimating a compression ratio for a packet in the packet traffic based on a compression length for compressing the packet;
    comparing the estimated compression ratio with a target compression ratio;
    adjusting the compression length when the estimated compression ratio has not reached at least the target compression ratio, wherein the adjusting of the compression length includes deciding how much of the packet needs to be compressed without requiring an in depth packet inspection or taking notice of a content of the packet;
    using the adjusted compression length as the compression length for compressing the packet traffic; and,
    wherein the estimating, comparing and adjusting the compression length are repeated, wherein the compression length initially includes a portion of a header of the packet, then the adjusted compression length includes the header of the packet or a header of a subsequent packet, and then the subsequently adjusted compression length includes the header and a portion of a payload of the packet or a header and a portion of a payload of the subsequent packet or another subsequent packet.

2. The method as claimed in claim 1, wherein the estimating, comparing and adjusting the compression length are repeated for the packet until the estimated compression ratio reaches at least the target compression ratio.

3. The method as claimed in claim 2, wherein the estimating, comparing and adjusting the compression length are repeated for another one or more packet(s) in the packet traffic until the estimated compression ratio reaches at least the target compression ratio.

4. The method as claimed in claim 3, wherein the another one or more packet(s) of the packet traffic are at least one of:
    a) another one or more consecutive packet(s) within the packet traffic; and
    b) another one or more packet(s) spaced apart within the packet traffic.

5. The method as claimed in claim 1, wherein the estimating, comparing and adjusting the compression length are repeated based on at least one of:
    a) the estimated compression ratio reaching at least the target compression ratio;
    b) the estimated compression ratio being substantially the same as one or more previous estimated compression ratio(s); and
    c) the change in compression gain from a previous iteration of the estimating, comparing and adjusting is less than a compression gain threshold value.

6. The method as claimed in claim 1, wherein the estimating, comparing and adjusting the compression length are repeated at periodic intervals.

7. The method as claimed in claim 1, further comprising:
   determining whether to adjust the compression length based on one or more of the current compression length, the target compression ratio, any previous compression lengths, and any previous estimated compression ratios.

8. The method as claimed in claim 1, wherein adjusting the compression length comprises determining whether to increase or decrease the compression length as a function of one or more of the current compression length, the current target compression ratio, any previous compression length(s), any previous estimated compression ratios, headers of the packet, payload data of the packet, headers of the packet traffic, and payload of at least a portion of the packet traffic.

9. The method as claimed in claim 1, wherein the packet is an uncompressed packet and estimating the compression ratio comprises compressing the packet based on the compression length.

10. The method as claimed in claim 1, wherein the packet is a compressed packet and estimating the compression ratio comprises decompressing the packet based on the compression length; and
   using the compression length further comprises transmitting the compression length based on the adjusted compression length to the compressor that compressed the packet for use in compressing further packets in the packet traffic.

11. A method for compressing packet traffic associated with a user equipment in a network, the method comprising:
   estimating a compression ratio for a packet in the packet traffic based on a compression length for compressing the packet;
   comparing the estimated compression ratio with a target compression ratio;
   adjusting the compression length when the estimated compression ratio has not reached at least the target compression ratio, wherein the adjusting of the compression length includes deciding how much of the packet needs to be compressed without requiring an in depth packet inspection or taking notice of a content of the packet;
   using the adjusted compression length as the compression length for compressing the packet traffic; and,
   wherein the estimating, comparing and adjusting the compression length are repeated a fixed number of times.

12. A method for compressing packet traffic associated with a user equipment in a network, the method comprising:
   estimating a compression ratio for a packet in the packet traffic based on a compression length for compressing the packet;
   comparing the estimated compression ratio with a target compression ratio;
   adjusting the compression length when the estimated compression ratio has not reached at least the target compression ratio, wherein the adjusting of the compression length includes deciding how much of the packet needs to be compressed without requiring an in depth packet inspection or taking notice of a content of the packet;
   using the adjusted compression length as the compression length for compressing the packet traffic; and,
   wherein the compression length is adjusted by a compression length step size.

13. The method as claimed in claim 12, further comprising:
   adjusting the compression length step size to increase the likelihood the estimated compression ratio reaches at least the target compression ratio.

14. The method as claimed in claim 12, further comprising:
   determining the compression length step size for adjusting the compression length as a function of one or more of any previous compression length(s), the estimated compression ratio, the target compression ratio, any previous estimated compression ratio(s), headers and/or payload data of the packet, headers and/or payload data of at least a portion of the packet traffic.

15. An apparatus for use when compressing packet traffic associated with a user equipment, the apparatus comprising:
   a processor;
   a memory containing instructions that, when executed by the processor, cause the apparatus to:
   estimate a compression ratio for a packet in the packet traffic based on a compression length for compressing the packet;
   compare the estimated compression ratio with a target compression ratio;
   adjust the compression length when the estimated compression ratio has not reached at least the target compression ratio, wherein the adjustment of the compression length includes deciding how much of the packet needs to be compressed without requiring an in depth packet inspection or taking notice of a content of the packet;
   use the adjusted compression length as the compression length for compressing the packet traffic; and,
   wherein the instructions further cause the apparatus to repeat the estimation, comparison and adjustment of the compression length, wherein the compression length initially includes a portion of a header of the packet, then the adjusted compression length includes the header of the packet or a header of a subsequent packet, and then the subsequently adjusted compression length includes the header and a portion of a payload of the packet or a header and a portion of a payload of the subsequent packet or another subsequent packet.

16. The apparatus as claimed in claim 15, wherein the instructions further cause the apparatus to repeat the estimation, comparison and adjustment of the compression length for the packet until the estimated compression ratio reaches at least the target compression ratio.

17. The apparatus as claimed in claim 15, wherein the instructions further cause the apparatus to repeat the estimation, comparison and adjustment of the compression length for another one or more packets in the packet traffic until the estimated compression ratio reaches at least the target compression ratio.

18. The apparatus as claimed in claim 17, wherein the another one or more packets of the packet traffic comprises at least one of:
   a) another one or more consecutive packet(s) within the packet traffic; and
   b) another one or more packet(s) spaced apart within the packet traffic.

19. The apparatus as claimed in claim 15, wherein the instructions further cause the apparatus to repeat the estimation, comparison and adjustment of the compression length is based on at least one of:

a) the estimated compression ratio reaching at least the target compression ratio;
b) the estimated compression ratio being substantially the same as one or more previous estimated compression ratio(s);
c) the change in compression gain from a previous iteration of the estimation, comparison and adjustment being less than a compression gain threshold value.

20. The apparatus as claimed in claim 15, wherein the instructions further cause the apparatus to repeat the estimation, comparison and adjustment of the compression length at periodic intervals.

21. The apparatus as claimed in claim 15, wherein the instructions further cause the apparatus to determine whether to adjust the compression length based on one or more of the current compression length, the target compression ratio, any previous compression lengths, and any previous estimated compression ratios.

22. The apparatus as claimed in claim 15, wherein the instructions further cause the apparatus to adjust the compression length by determining whether to increase or decrease the compression length as a function of one or more of the current compression length, the current target compression length, any previous compression length(s), any previous estimated compression ratios, headers of the packet, payload data of the packet, headers of the packet traffic, and payload of at least a portion of the packet traffic.

23. The apparatus as claimed in claim 15, wherein the instructions further cause the apparatus to adjust the compression length step size to increase the likelihood the estimated compression ratio reaches at least the target compression ratio.

24. The apparatus as claimed in claim 15, wherein the packet is an uncompressed packet and the instructions further cause the apparatus to estimate the compression ratio by compressing the packet based on the compression length and then estimating the compression ratio.

25. The apparatus as claimed in claim 15, wherein the packet is a compressed packet and the instructions further cause the apparatus to estimate the compression ratio by decompressing the packet based on the compression length before estimating the compression ratio; and
wherein the instructions further cause the apparatus to use the compression length by transmitting the compression length based on the adjusted compression length to the compressor that compressed the packet for use in compressing further packets in the packet traffic.

26. The apparatus as claimed in claim 15, wherein the apparatus is one of the user equipment and a network entity configured for transmitting the packet traffic to the user equipment through a communications network.

27. An apparatus for use when compressing packet traffic associated with a user equipment, the apparatus comprising:
a processor;
a memory containing instructions that, when executed by the processor, cause the apparatus to:
estimate a compression ratio for a packet in the packet traffic based on a compression length for compressing the packet;
compare the estimated compression ratio with a target compression ratio;
adjust the compression length when the estimated compression ratio has not reached at least the target compression ratio, wherein the adjustment of the compression length includes deciding how much of the packet needs to be compressed without requiring an in depth packet inspection or taking notice of a content of the packet;
use the adjusted compression length as the compression length for compressing the packet traffic; and,
wherein the instructions further cause the apparatus to repeat the estimation, comparison and adjustment of the compression length a fixed number of times.

28. An apparatus for use when compressing packet traffic associated with a user equipment, the apparatus comprising:
a processor;
a memory containing instructions that, when executed by the processor, cause the apparatus to:
estimate a compression ratio for a packet in the packet traffic based on a compression length for compressing the packet;
compare the estimated compression ratio with a target compression ratio;
adjust the compression length when the estimated compression ratio has not reached at least the target compression ratio, wherein the adjustment of the compression length includes deciding how much of the packet needs to be compressed without requiring an in depth packet inspection or taking notice of a content of the packet;
use the adjusted compression length as the compression length for compressing the packet traffic; and,
wherein the instructions further cause the apparatus to adjust the compression length by a compression length step size.

29. The apparatus as claimed in claim 28, wherein the instructions further cause the apparatus to determine the compression length step size for adjusting the compression length as a function of one or more of any previous compression length(s), the estimated compression ratio, the target compression ratio, any previous estimated compression ratio(s), headers and/or payload data of the packet, headers and/or payload data of at least a portion of the packet traffic.

* * * * *